(12) United States Patent
Okuoka

(10) Patent No.: US 11,966,099 B2
(45) Date of Patent: Apr. 23, 2024

(54) CONVERTER LENS, INTERCHANGEABLE LENS, AND IMAGE PICKUP APPARATUS

(71) Applicant: CANON KABUSHIKI KAISHA, Tokyo (JP)

(72) Inventor: Shinya Okuoka, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 93 days.

(21) Appl. No.: 17/814,772

(22) Filed: Jul. 25, 2022

(65) Prior Publication Data

US 2022/0357559 A1 Nov. 10, 2022

Related U.S. Application Data

(63) Continuation of application No. 16/443,657, filed on Jun. 17, 2019, now Pat. No. 11,448,856.

(30) Foreign Application Priority Data

Jun. 26, 2018 (JP) .................................. 2018-121364

(51) Int. Cl.
*G02B 9/04* (2006.01)
*G03B 17/14* (2021.01)
*H04N 23/55* (2023.01)

(52) U.S. Cl.
CPC ............... *G02B 9/04* (2013.01); *G03B 17/14* (2013.01); *H04N 23/55* (2023.01)

(58) Field of Classification Search
CPC ........ G02B 9/04; G02B 13/006; G02B 15/04; G02B 9/64; G03B 17/14; G03B 17/565; H04N 23/55
See application file for complete search history.

(56) References Cited

U.S. PATENT DOCUMENTS

| 10,197,893 | B2* | 2/2019 | Ori ........................ G02B 15/10 |
| 10,409,032 | B2* | 9/2019 | Ogata ................ G02B 27/0025 |
| 11,029,488 | B2* | 6/2021 | Ori ........................ G02B 15/12 |
| 2016/0274443 | A1* | 9/2016 | Ogata .................... G02B 15/10 |
| 2017/0277022 | A1 | 9/2017 | Ori | |

FOREIGN PATENT DOCUMENTS

| JP | 2009080176 A | * | 4/2009 | ............. G02B 15/12 |
| JP | 2016-191761 A | | 11/2016 | |
| JP | 2017-026985 A | | 2/2017 | |
| JP | 2018-60093 A | | 4/2018 | |
| WO | 2017/134928 A1 | | 8/2017 | |

* cited by examiner

*Primary Examiner* — Collin X Beatty
(74) *Attorney, Agent, or Firm* — CANON U.S.A., INC. IP Division

(57) ABSTRACT

A converter lens includes three or more negative lenses and increases the focal length of an entire system, in which an average refractive index Ndave at the d-line (wavelength of 587.56 nm) of a material of all the negative lenses included in the converter lens is defined.

16 Claims, 22 Drawing Sheets

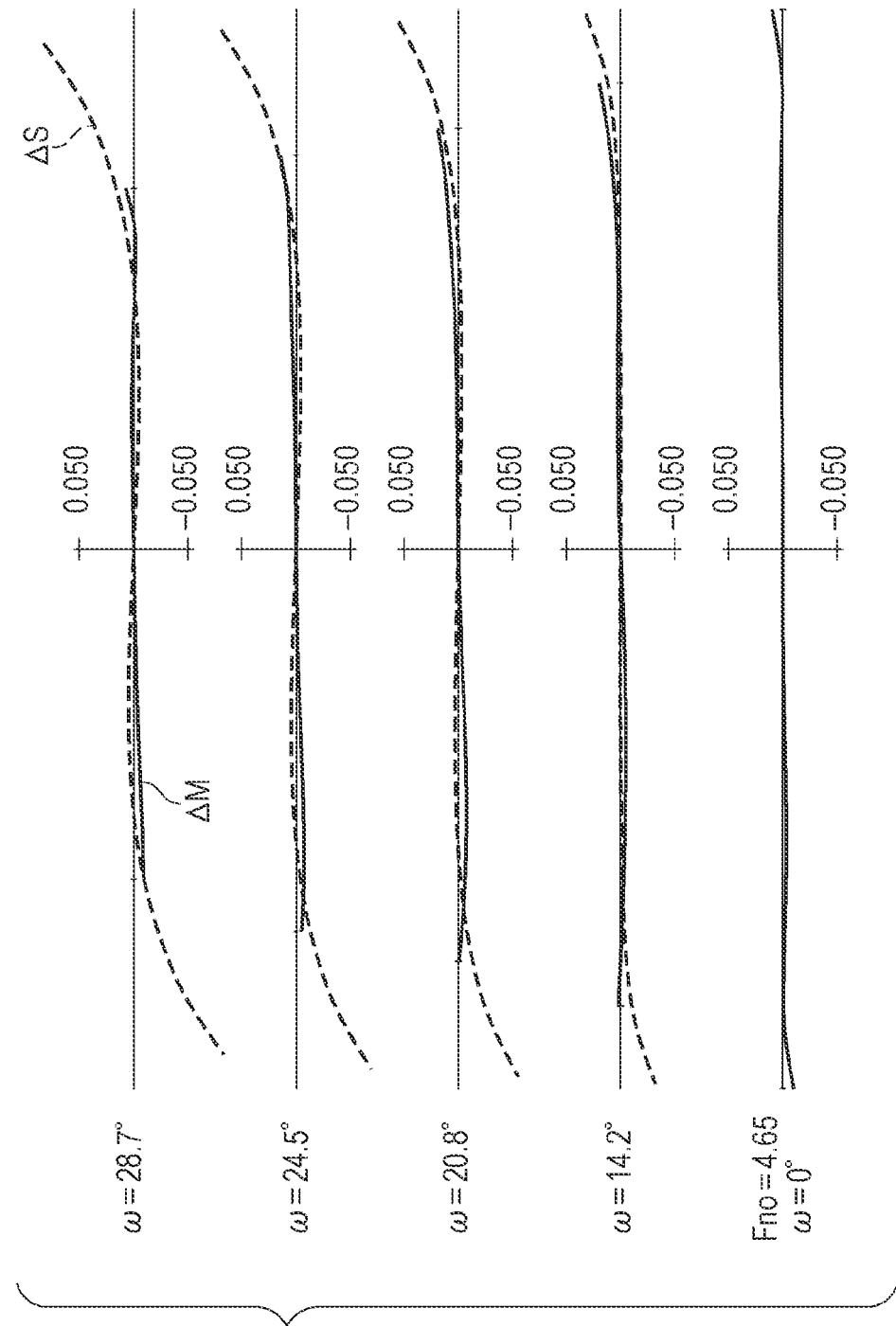

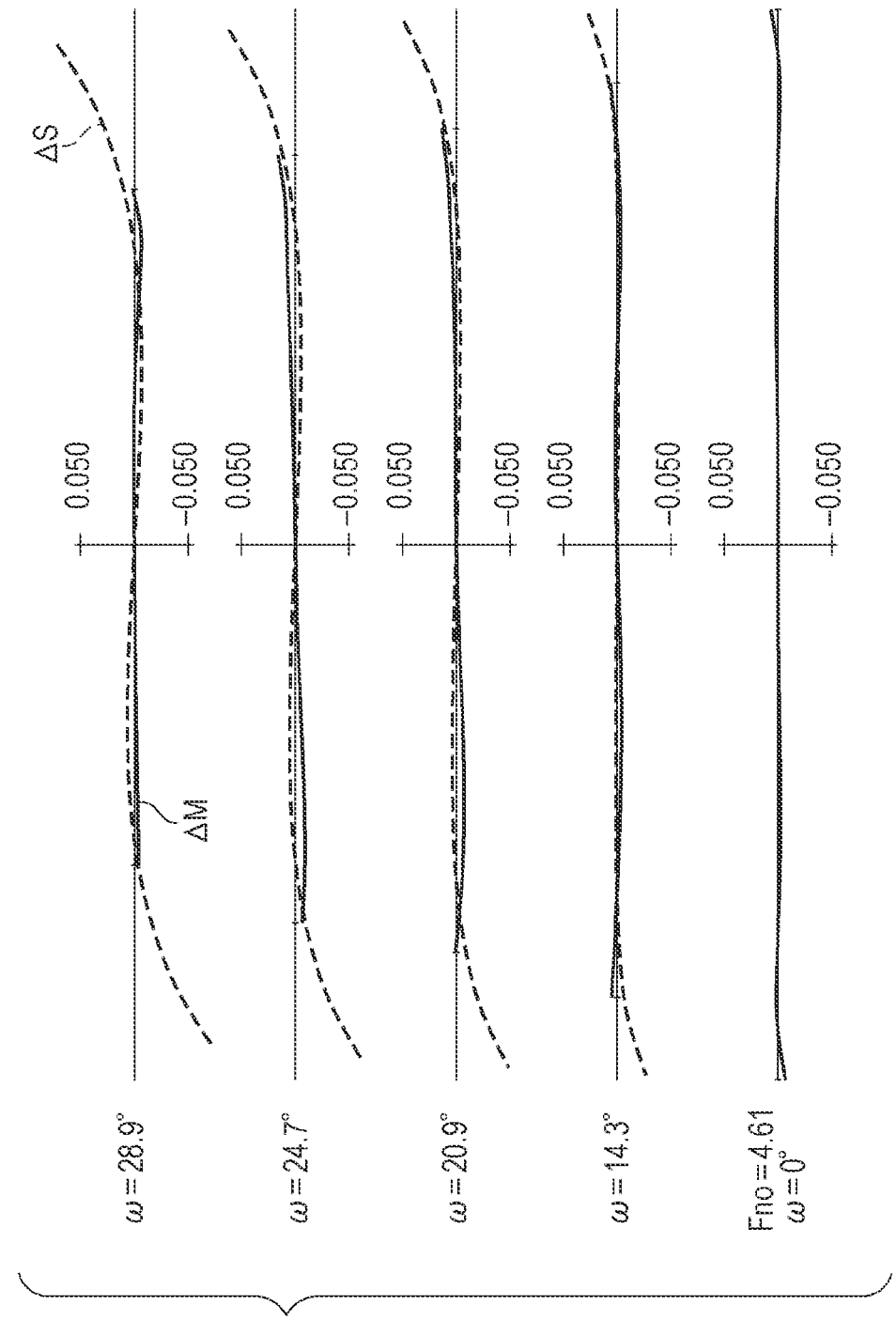

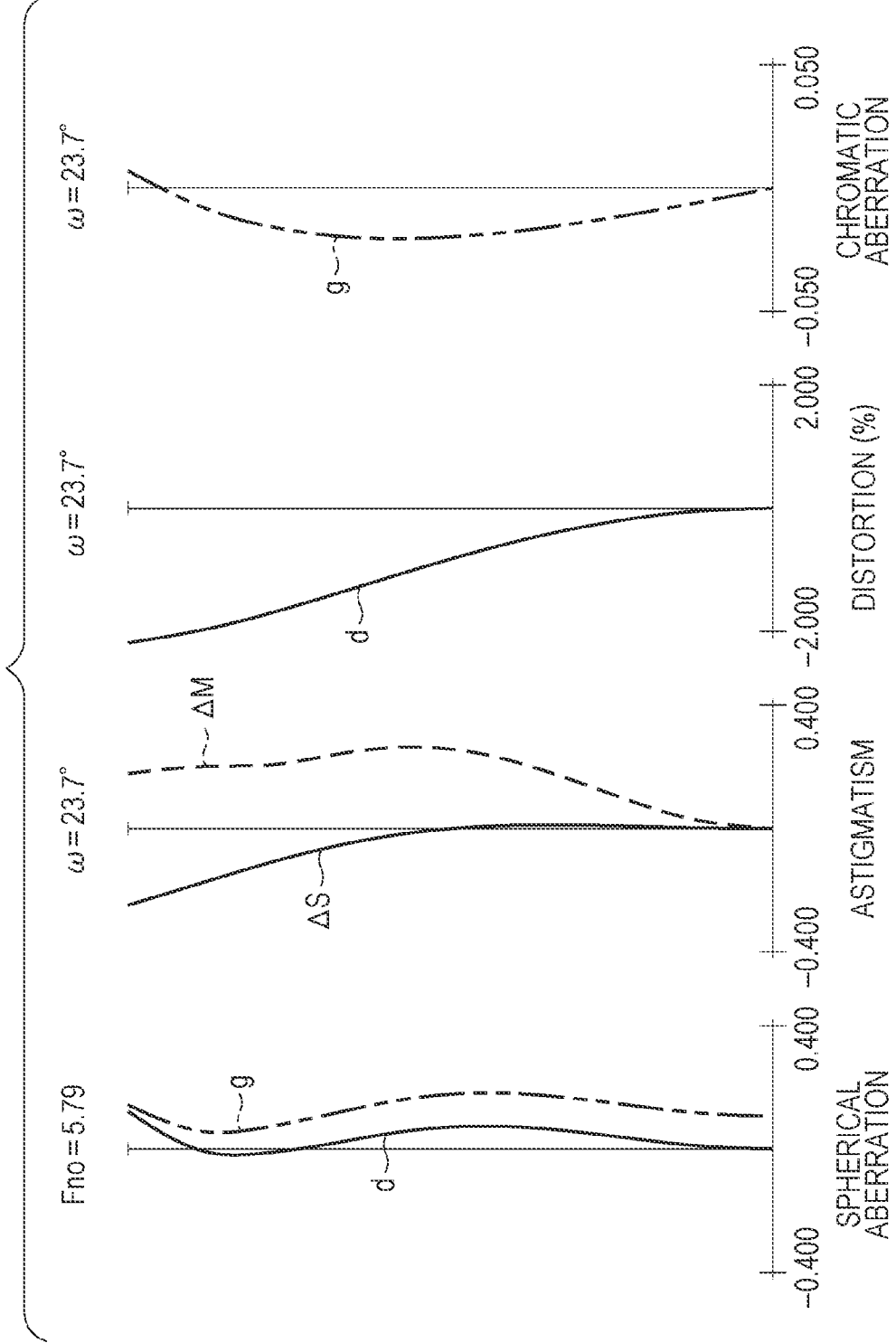

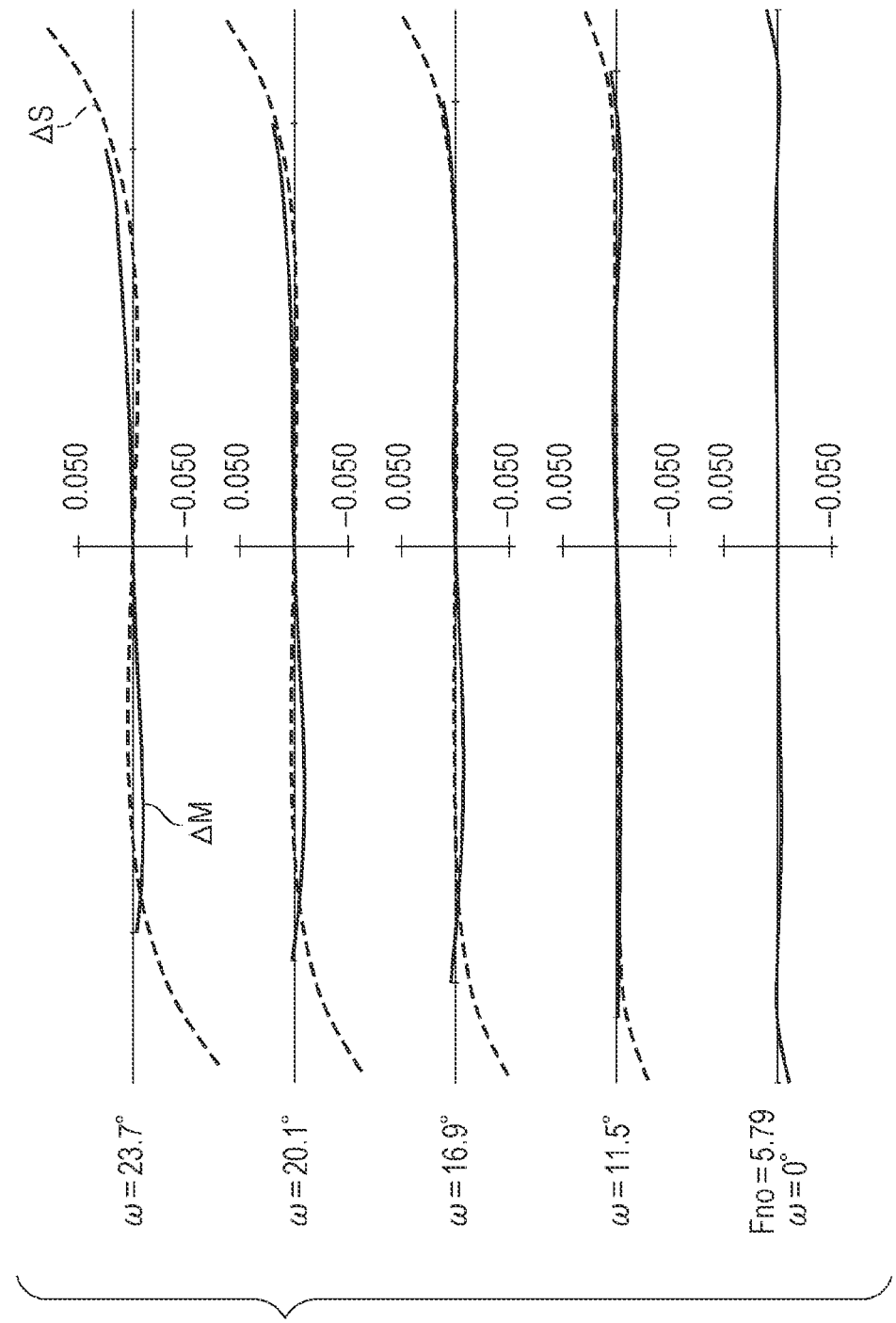

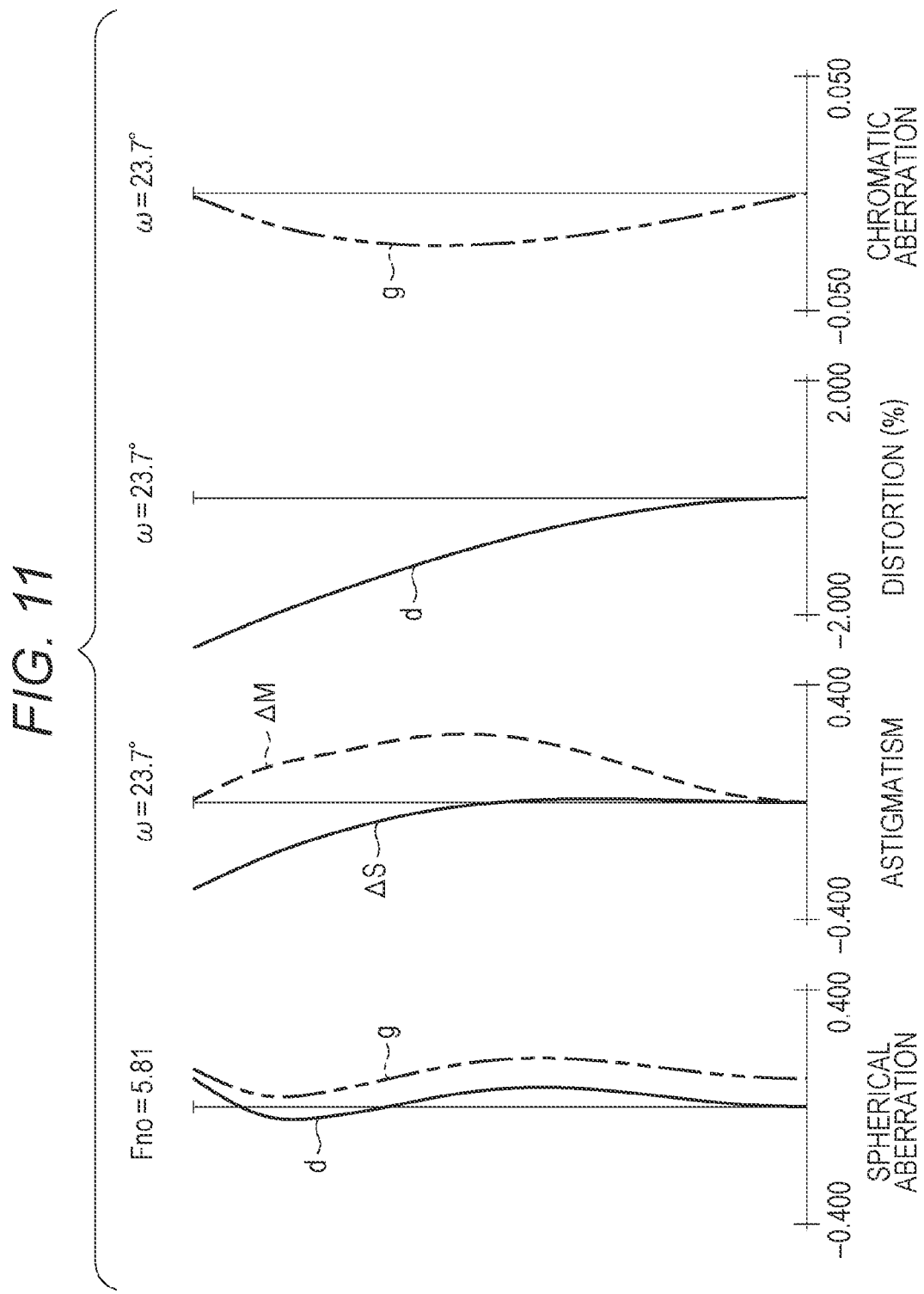

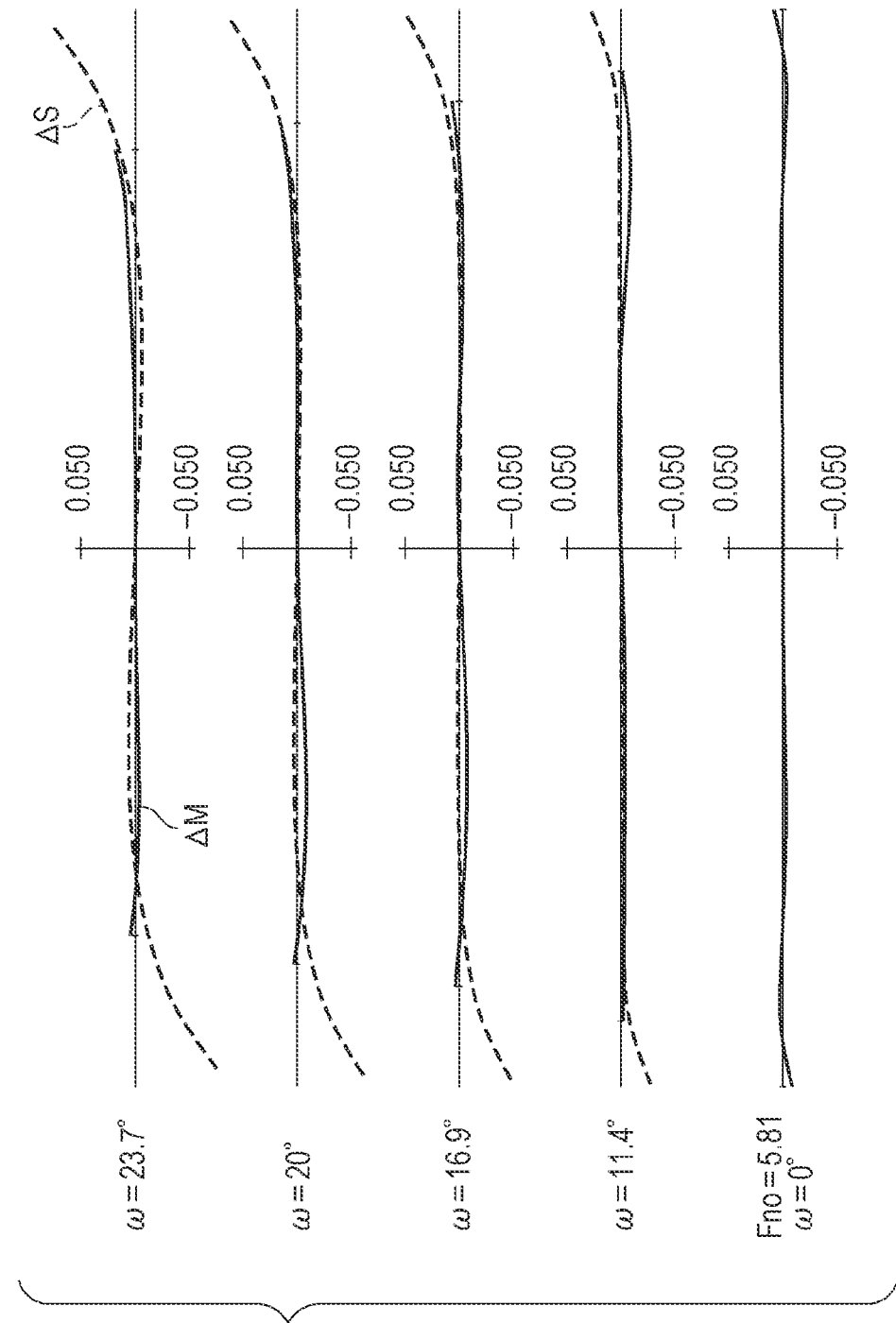

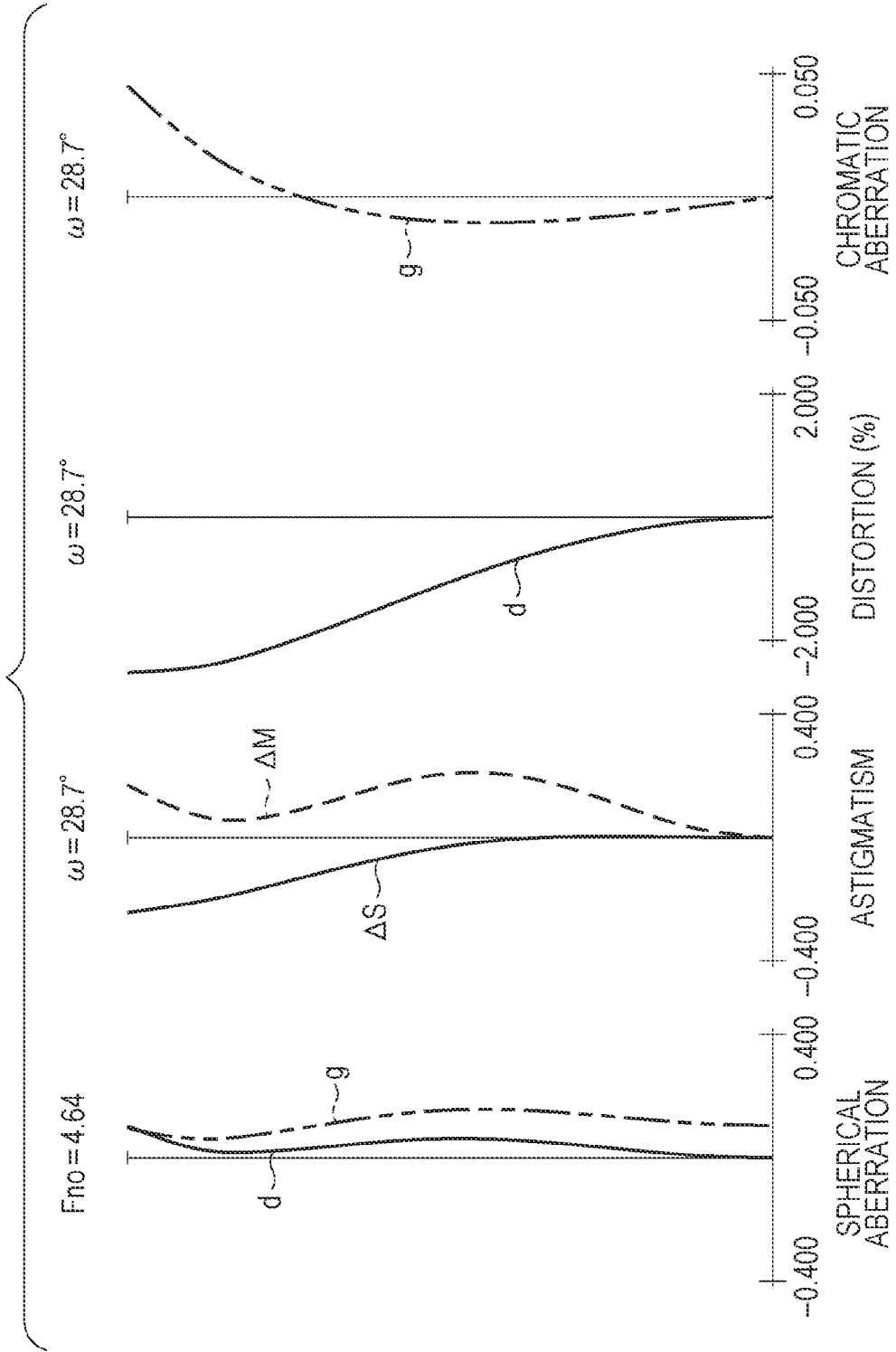

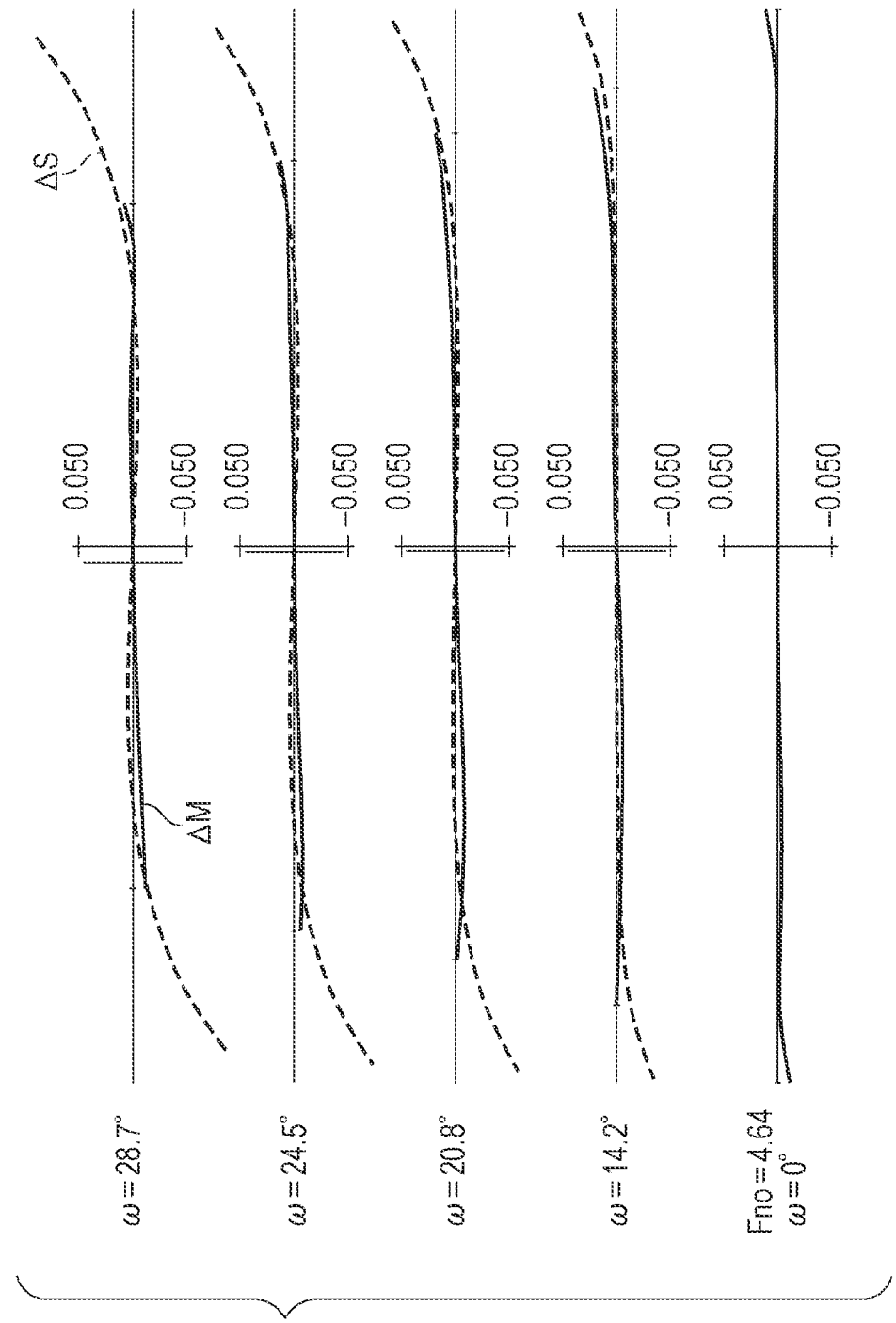

CONVERTER LENS, INTERCHANGEABLE LENS, AND IMAGE PICKUP APPARATUS

CROSS-REFERENCE TO RELATED APPLICATION

This application is a Continuation of U.S. application Ser. No. 16/443,657, filed Jun. 17, 2019, which claims priority from Japanese Patent Application No. 2018-121364 filed Jun. 26, 2018, which are hereby incorporated by reference herein in their entireties.

BACKGROUND OF THE INVENTION

Field of the Invention

The aspect of the embodiments relates to a converter lens, an interchangeable lens, and an image pickup apparatus.

Description of the Related Art

There is known a rear converter lens (denoted as converter lens below) capable of increasing the focal length of an entire system when being arranged between an interchangeable lens and an image pickup apparatus.

US2017/0277022 discloses a converter lens including five negative lenses and a focal length enlarging magnification of 2.0.

Generally, a converter lens has a negative refractive power and the negative refractive power tends to increase along with an increase in focal length enlarging magnification. Further, there has been known that when the curvature of a negative lens in a converter lens is increased in order to increase the negative refractive power, aberrations such as coma aberration due to off-axis light easily occur.

Further, the converter lens does not include an aperture stop, and thus an off-axis light passing through a master lens in an interchangeable lens enters an image plane although its principal light does not cross with an optical axis of the converter lens. Aberration correction cannot be made by the lenses arranged before and after the aperture stop like the interchangeable lens, and thus the aberration correction is likely to be difficult to make by the converter lens.

SUMMARY OF THE INVENTION

According to the aspect of the embodiments, a converter lens has a negative refractive power and increases a focal length of an entire system when arranged on an image side of a master lens. The converter lens consists of: a first lens unit having positive refractive power; and a second lens unit having negative refractive power and arranged on an image side of the first lens unit, in which the first lens unit consists of a negative lens and a first positive lens, three or more negative lenses are included in the converter lens, and the following conditional equation is satisfied:

$$1.92 < Ndave < 2.10.$$

where Ndave represents an average refractive index at a d-line of a material of all negative lenses included in the converter lens.

Further features of the disclosure will become apparent from the following description of exemplary embodiments (with reference to the attached drawings).

BRIEF DESCRIPTION OF THE DRAWINGS

FIG. 3 is a lateral aberration diagram at the time of in-focus on an infinite object when the converter lens according to the first embodiment is arranged on the image side of the master lens.

FIG. 6 is a lateral aberration diagram at the time of in-focus on an infinite object when the converter lens according to the second embodiment is arranged on the image side of the master lens.

FIG. 8 is a longitudinal aberration diagram at the time of in-focus on an infinite object when the converter lens according to the third embodiment is arranged on the image side of the master lens.

FIG. 9 is a lateral aberration diagram at the time of in-focus on an infinite object when the converter lens according to the third embodiment is arranged on the image side of the master lens.

FIG. 11 is a longitudinal aberration diagram at the time of in-focus on an infinite object when the converter lens according to the fourth embodiment is arranged on the image side of the master lens.

FIG. 12 is a lateral aberration diagram at the time of in-focus on an infinite object when the converter lens according to the fourth embodiment is arranged on the image side of the master lens.

FIG. 14 is a longitudinal aberration diagram at the time of in-focus on an infinite object when the converter lens according to the fifth embodiment is arranged on the image side of the master lens.

FIG. 15 is a lateral aberration diagram at the time of in-focus on an infinite object when the converter lens according to the fifth embodiment is arranged on the image side of the master lens.

DESCRIPTION OF THE EMBODIMENTS

Converter lenses according to embodiments of the disclosure and an image pickup apparatus will be described below in detail with reference to the attached drawings.

When the refractive indexes of d-line (587.56 nm), F-line (486.13 nm), and C-line (656.27 nm) in the Fraunhofer lines are respectively represented as Nd, NF, and NC, the Abbe constant vd of a material is expressed as follows:

$$vd=(Nd-1)/(NF-NC).$$

A converter lens according to each embodiment is arranged between an image pickup apparatus and an interchangeable lens detachable from the image pickup apparatus, for example. A converter lens according to each embodiment can further increase the focal length of an imaging optical system (entire system) consisting of an optical system of the interchangeable lens and the converter lens than the focal length when the imaging optical system is configured of only the interchangeable lens.

Figure 19:
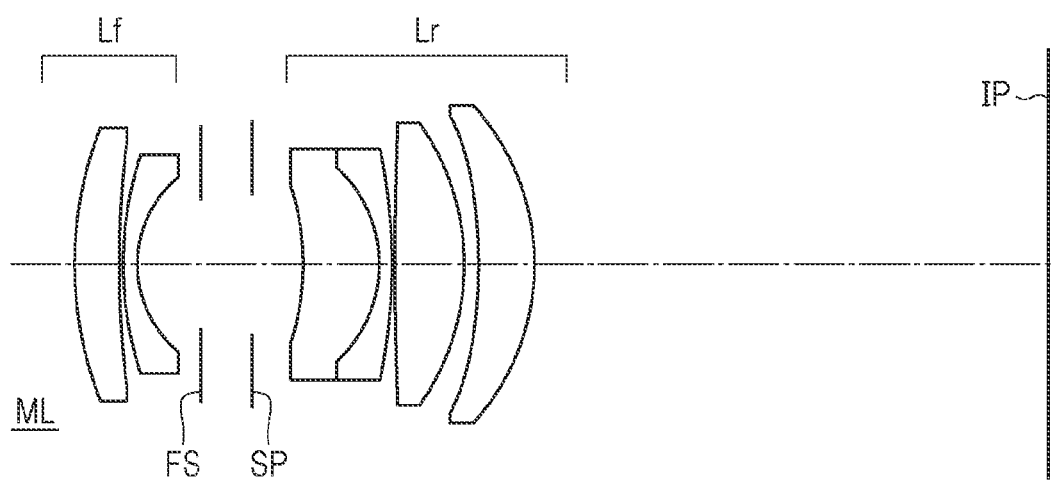
FIG. 19 is a cross-section view of the master lens.

The left side is an object side (front) and the right side is an image side (rear) in the cross-section views of the converter lens illustrated in FIGS. 1, 4, 7, 10, 13, and 16 and the cross-section view of the master lens illustrated in FIG. 19. Li represents i-th lens unit when "i" is an order of lens unit from the object side toward the image side in each cross-section view An aperture stop SP determines (limits) a beam of full aperture F-number (Fno). FP indicates a flare-cut stop for cutting undesirable lights.

When the image pickup apparatus is a digital video camera or a digital camera, an image plane IP corresponds to an imaging device (photoelectric conversion device) such as CCD sensor or CMOS sensor. When the image pickup apparatus is a silver-halide film camera, the image plane IP corresponds to a film surface.

Figure 20:
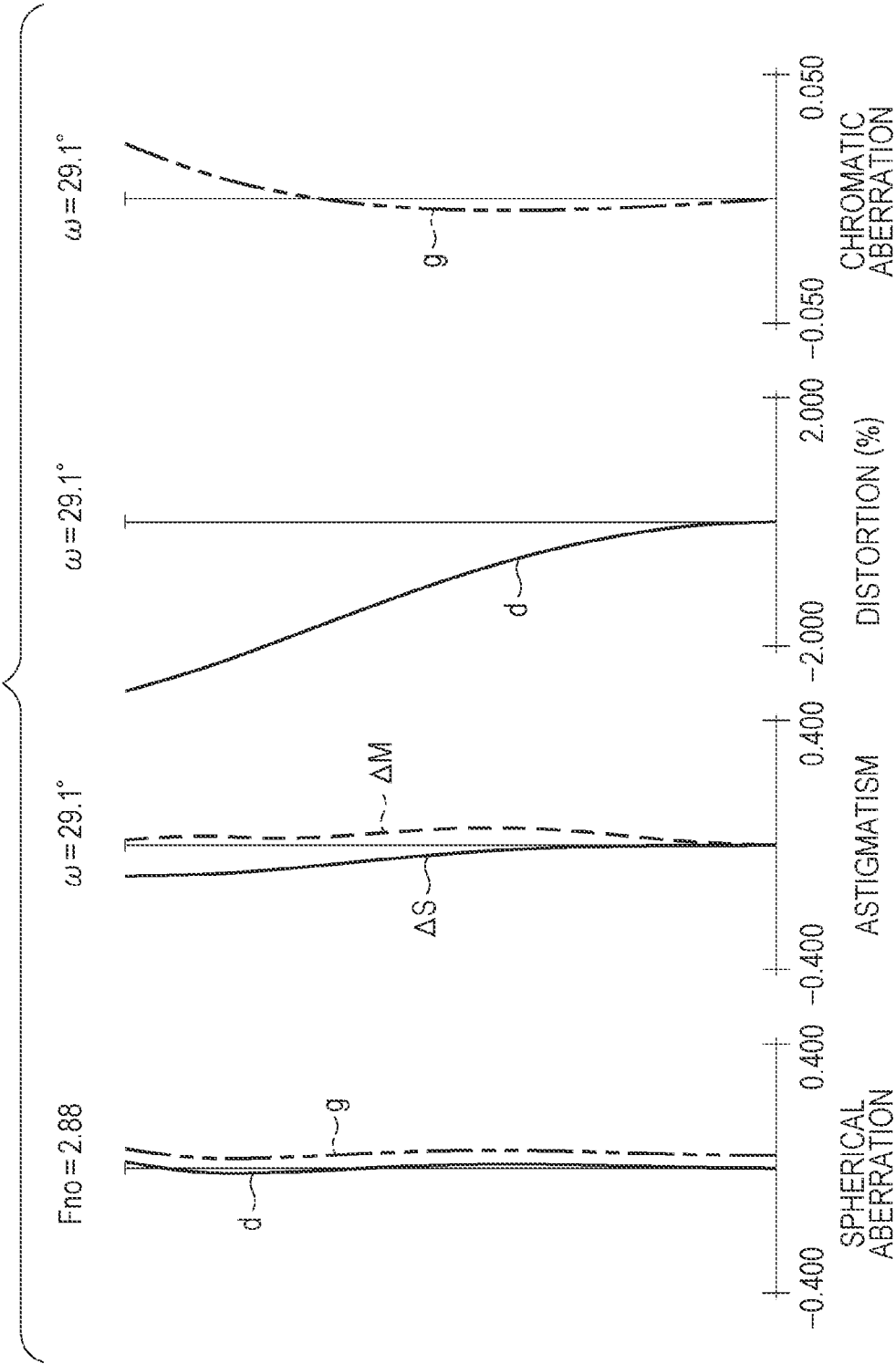
FIG. 20 is a longitudinal aberration diagram of the master lens at the time of in-focus on an infinite object.

FIGS. 2, 5, 8, 11, 14, and 17 are longitudinal aberration diagrams of the converter lenses according to the embodiments described below, respectively, and FIG. 20 is a longitudinal aberration diagram of a master lens. In the spherical aberration diagrams, the solid line indicates the d-line and the two-dot chain line indicates the g-line. The broken line M indicates a meridional image plane and the solid line S indicates a sagittal image plane in the astigmatism diagrams. Distortion aberration is indicated for the d-line. Magnification chromatic aberration is indicated for the g-line. ω indicates a half angle of view (degrees) and Fno indicates an F-number.

Figure 21:
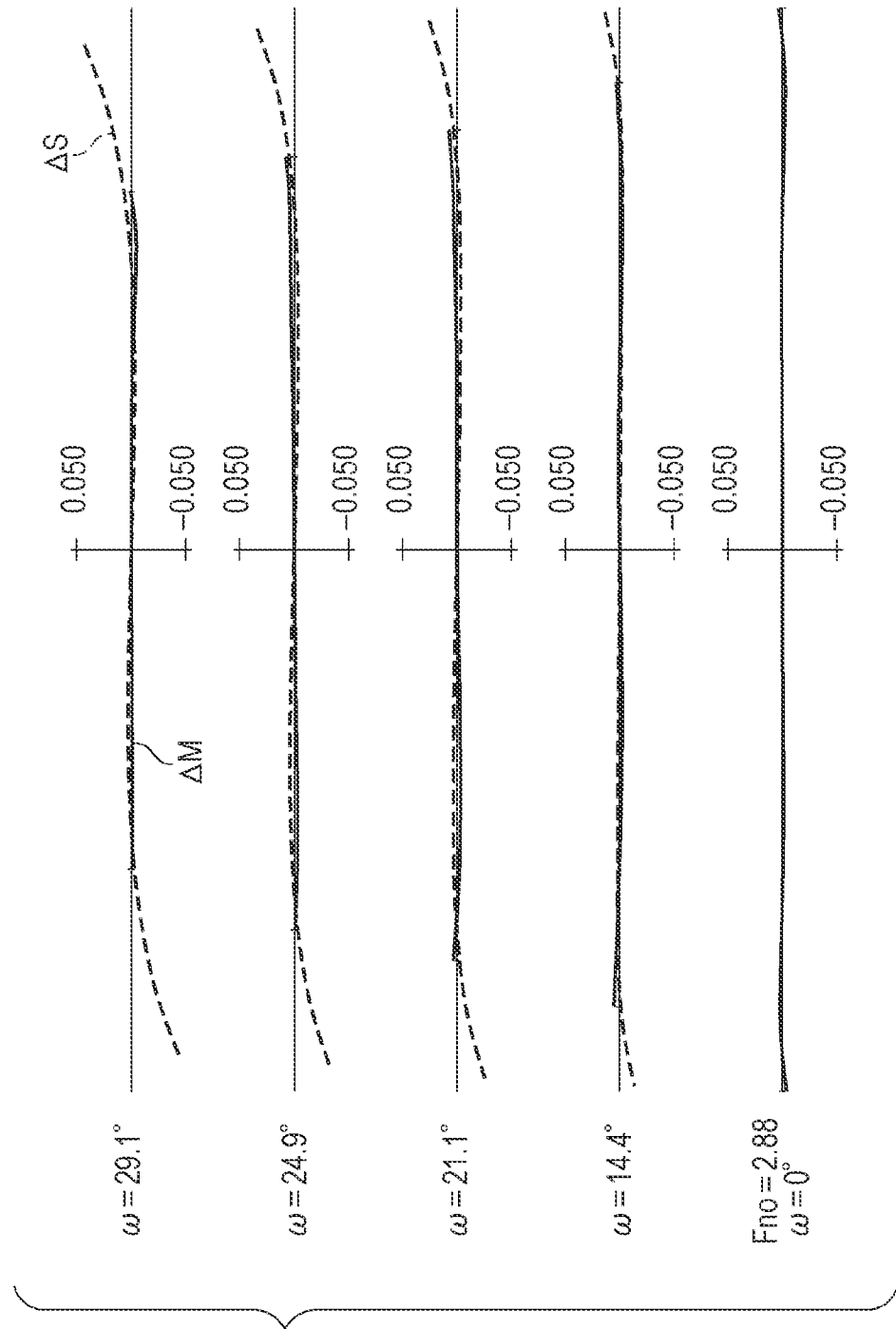
FIG. 21 is a lateral aberration diagram of the master lens at the time of in-focus on an infinite object.

FIGS. 3, 6, 9, 12, 15, and 18 are lateral aberration diagrams of the converter lenses according to the embodiments described below, respectively, and FIG. 21 is a lateral aberration diagram of the master lens. In the lateral aberration diagrams, the broken line M indicates aberration on the meridional image plane, and the solid line S indicates aberration on the sagittal image plane.

As described above, in a converter lens entirely having a negative refractive power, aberrations such as coma aberration due to off-axis light easily occur and is likely to be difficult to correct.

Thus, the converter lenses according to the embodiments entirely have a negative refractive power and include three or more negative lenses. Then, the average refractive index of a material of the negative lenses included in a converter lens is made relatively higher thereby to decrease the curvature of each lens surface and to restrict an occurrence of aberrations such as coma aberration due to off-axis light.

Specifically, when Ndave represents the average refractive index at the d-line (wavelength of 587.56 nm) of the material of all the negative lenses included in the converter lens, the following conditional equation is satisfied:

$$1.92<Ndave<2.10 \quad (1).$$

When the average refractive index of the material of the lenses lowers the lower limit of the conditional equation (1), the Petzval sum can be set to be small, and the image curvature and the like are easy to correct. However, undesirably the curvatures of the surfaces of the lenses increase, and aberrations such as coma aberration are difficult to correct.

When the average refractive index of the material increases, the dispersion of the glass material generally increases. Thus, when the average refractive index of the material of the negative lenses is higher than the upper limit of the conditional equation (1), undesirably magnification chromatic aberration is difficult to correct.

In this way, the converter lenses according to the embodiments meet the above lens configuration and the conditional equation (1), and thus aberration due to off-axis light such as coma aberration can be corrected, and high optical performance can be obtained also when the converter lenses are mounted on the master lens.

Further, the converter lenses according to the present embodiments are used so that the master lens for an image pickup apparatus including an imaging device with a low maximum image height can be used by a user without a feeling of strangeness in terms of aberration even when it is used for an image pickup apparatus including an imaging device with a high maximum image height.

In one embodiment, the numerical range of the conditional equation (1) is set as follows:

$$1.95<Ndave<2.08 \quad (1a).$$

Further, the numerical range of the conditional equation (1) is set as follows:

$$1.98<Ndave<2.05 \quad (1b).$$

Further, a converter lens may include three or more negative lenses and more preferably four or more negative lenses in a second lens unit.

Further, a converter lens meets one or more of the following conditional equations:

$$1.30<(R1+R2)/(R1-R2)<2.50 \qquad (2)$$

$$0.10<sk/TD<0.50 \qquad (3)$$

$$-2.30<f1/f2<-0.95 \qquad (4)$$

$$-1.40<f1/f<-0.30 \qquad (5).$$

The curvature radius of the surface on the object side of the lens arranged closest to the image side is represented as R1, and the curvature radius of the surface on the image side of the lens is represented as R2. The air-converted length from the surface of the converter lens closest to the image side to the image plane when the converter lens is arranged on the image side of the master lens is represented as sk, and the length on an optical axis from the surface of the converter lens closest to the object side to the surface closest to the image side is represented as TD. The focal length of a first lens unit is represented as f1, the focal length of a second lens unit is represented as f2, and the focal length of the converter lens is represented as f. Here, the first lens unit consists of one negative lens and one positive lens. The conditional equation (2) defines a shape of the positive lens in the converter lens arranged closest to the image side. In one embodiment, the curvature radius of one surface is larger than that of the other surface in order to largely refract an off-axis light and to restrict an occurrence of aberration. Thereby, an off-axis light can be further refracted than an on-axis light and aberrations due to an off-axis light can be easily corrected while an occurrence of aberration is restricted.

The conditional equation (2) is defined in terms of the above points. When a difference between the curvature of the surface on the image side and the curvature of the surface on the object side is larger to be below the lower limit of the conditional equation (2), undesirably the field curvature enters under-correction. When a difference between the curvature of the surface on the image side and the curvature of the surface on the object side is smaller to be over the upper limit of the conditional equation (2), undesirably the field curvature enters over-correction.

The conditional equation (3) defines a ratio of backfocus of the converter lens relative to the length (lens structure length) from the surface on the object side of the lens arranged closest to the object side to the surface on the image side arranged closest to the image side. Undesirably the lens structure length is longer when the conditional equation (3) is lowered. When the lens structure length is shorter to be over the conditional equation (3), undesirably the refractive power of each lens is higher and spherical aberration is difficult to correct.

The conditional equation (4) defines a ratio of the focal length of the first lens unit relative to the focal length of the second lens unit. When the lower limit of the conditional equation (4) is lowered, undesirably spherical aberration largely occurs to be over-correction and is difficult to correct. When the upper limit of the conditional equation (4) is exceeded, undesirably spherical aberration largely occurs to be under-correction and is difficult to correct.

The conditional equation (5) defines a ratio of the focal length of the first lens unit relative to the focal length of the converter lens. When the absolute value of the focal length of the first lens unit is larger to be below the lower limit of the conditional equation (5) and the refractive power is lower, undesirably spherical aberration occurs to be over-correction. When the absolute value of the focal length of the first lens unit is lower to be over the upper limit of the conditional equation (5) and the refractive power is higher, undesirably spherical aberration occurs to be under-correction.

Further, the numerical ranges of the conditional equations (2) to (5) are set as follows:

$$1.40<(R1+R2)/(R1-R2)<2.30 \qquad (2a)$$

$$0.15<sk/TD<0.40 \qquad (3a)$$

$$-2.10<f1/f2<-1.00 \qquad (4a)$$

$$-1.20<f1/f<-0.32 \qquad (5a).$$

Further, the numerical ranges of the conditional equations (2) to (5) are set as follows:

$$1.50<(R1+R2)/(R1-R2)<2.10 \qquad (2b)$$

$$0.25<sk/TD<0.35 \qquad (3b)$$

$$-1.90<f1/f2<-1.10 \qquad (4b)$$

$$-1.10<f1/f<-0.34 \qquad (5b).$$

At least one of the above conditional equations is satisfied, higher optical performance can be obtained in the entire system even when the converter lens is arranged on the image side of the master lens.

In one embodiment, the first lens unit consists of a cemented lens in which one negative lens and one positive lens are bonded. Thereby, an occurrence of chromatic aberration can be restricted.

The master lens according to an embodiment and the converter lenses according to the embodiments will be described below.

[Converter Lens]

The converter lenses according to the first to sixth embodiments will be described below.

First Embodiment

Figure 1A:
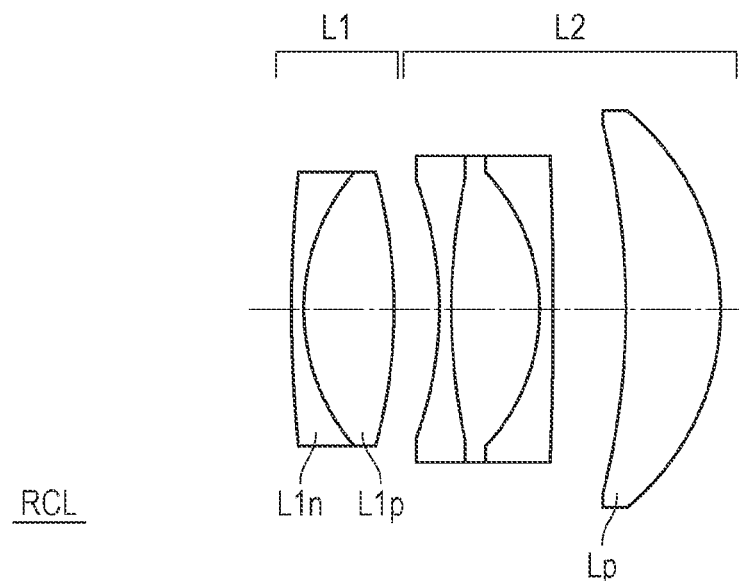
FIG. 1A is a cross-section view of a converter lens according to a first embodiment.
Figure 1B:
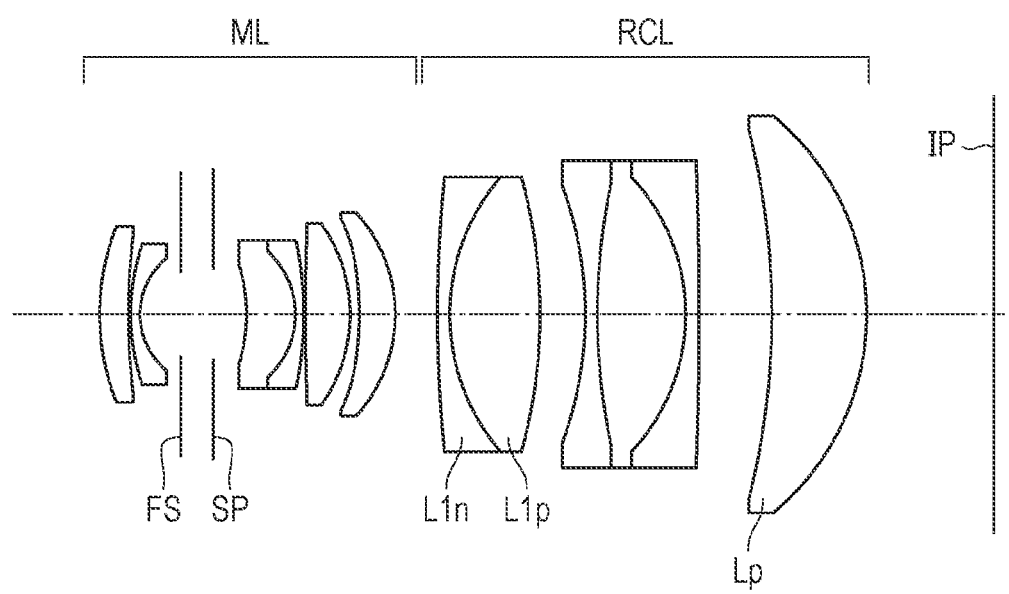
FIG. 1B is a cross-section view illustrating the converter lens according to the first embodiment arranged on an image side of a master lens.
Figure 2:
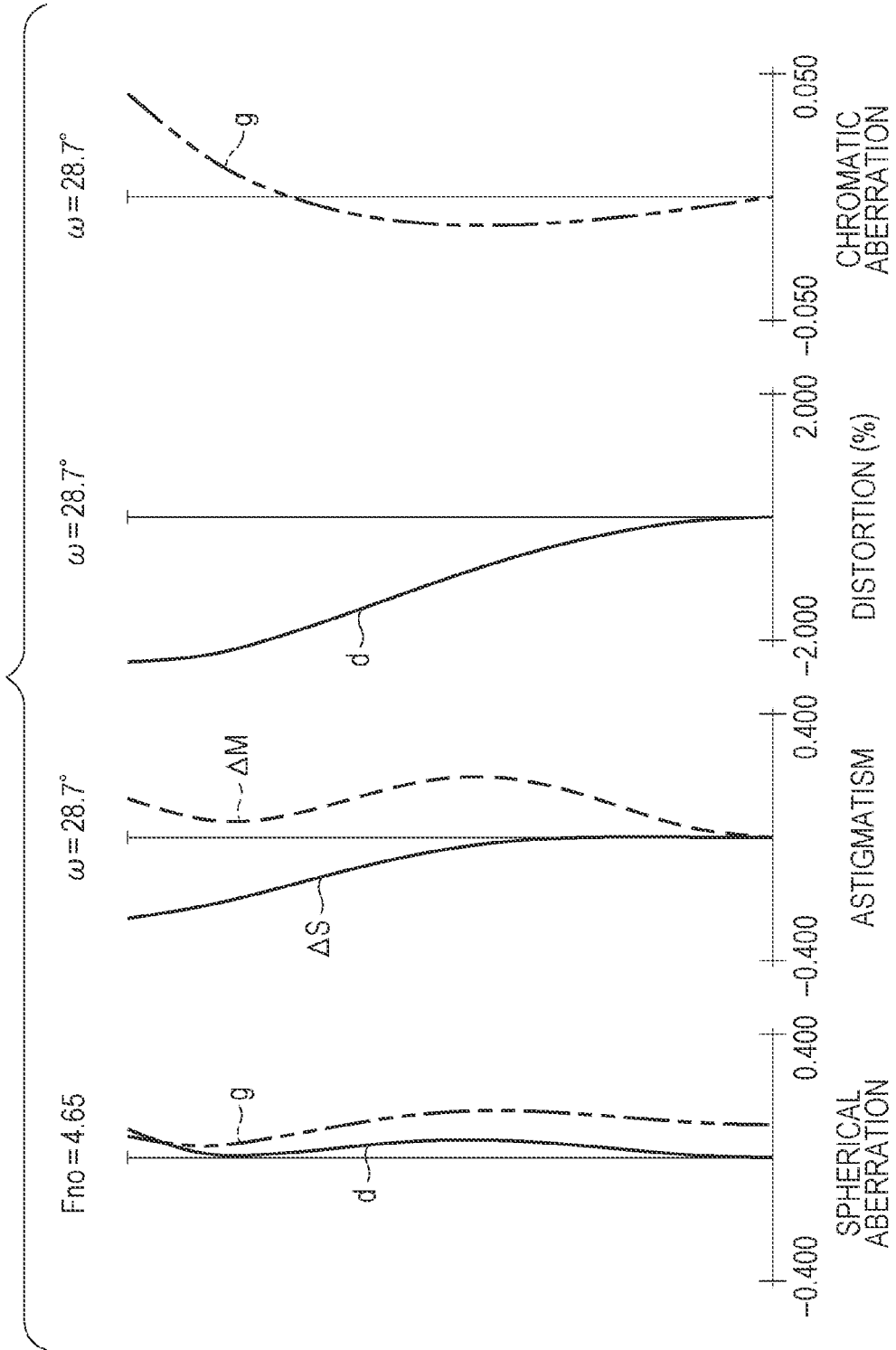
FIG. 2 is a longitudinal aberration diagram at the time of in-focus on an infinite object when the converter lens according to the first embodiment is arranged on the image side of the master lens.

FIG. 1A is a cross-section view of a converter lens RCL according to the first embodiment. FIG. 1B is a cross-section view of a master lens ML, and the converter lens RCL according to the first embodiment arranged on the image side of the master lens ML. FIG. 2 and FIG. 3 are a longitudinal aberration diagram and a lateral aberration diagram, respectively, at the time of in-focus on an infinite object when the converter lens RCL according to the first embodiment is arranged on the image side of the master lens ML. The enlarging magnification of the converter lens RCL is 1.61.

A first lens unit is configured of a cemented lens of a negative lens G1 and a positive lens G2.

A second lens unit consists of a cemented lens consisting of a negative lens, a positive lens, and a negative lens, and a positive lens arranged on the image side of the cemented lens. That is, the converter lens RCL includes three negative lenses.

Second Embodiment

Figure 4A:
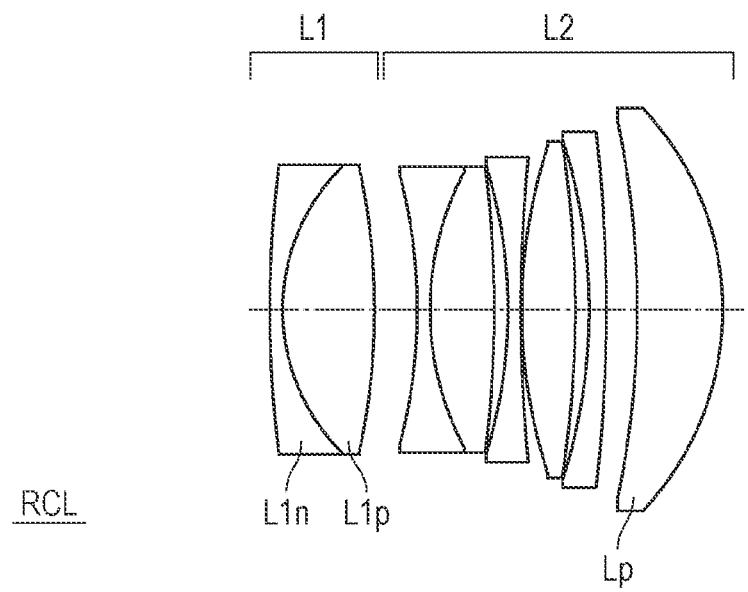
FIG. 4A is a cross-section view of a converter lens according to a second embodiment.
Figure 4B:
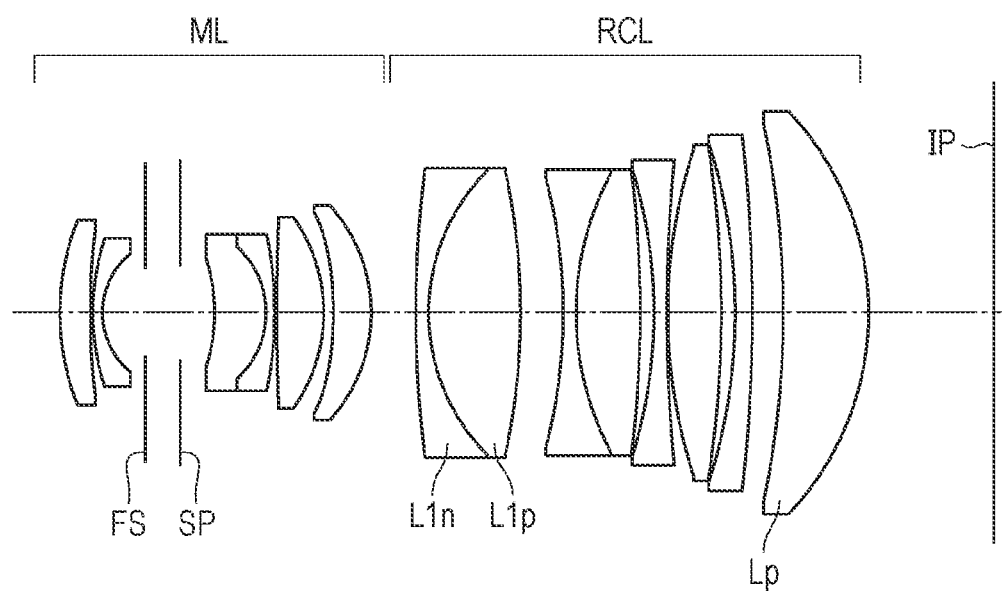
FIG. 4B is a cross-section view of the converter lens according to the second embodiment arranged on the image side of the master lens.
Figure 5:
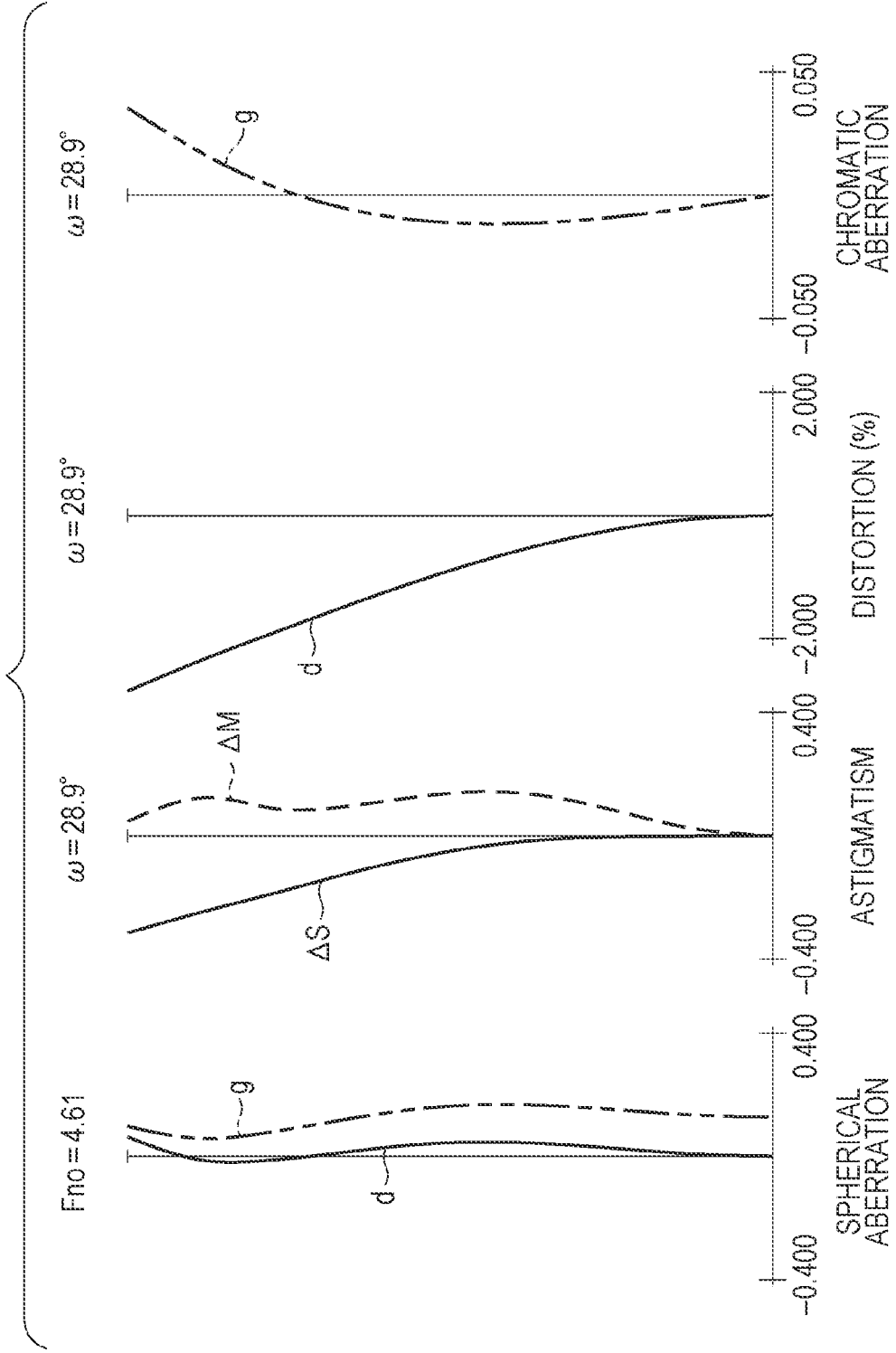
FIG. 5 is a longitudinal aberration diagram at the time of in-focus on an infinite object when the converter lens according to the second embodiment is arranged on the image side of the master lens.

FIG. 4A is a cross-section view of a converter lens RCL according to the second embodiment. FIG. 4B is a cross-section view of the master lens ML and the converter lens RCL according to the second embodiment arranged on the image side of the master lens ML. FIG. 5 and FIG. 6 are a longitudinal aberration diagram and a lateral aberration diagram, respectively, at the time of in-focus on an infinite object when the converter lens RCL according to the second embodiment is arranged on the image side of the master lens ML. The enlarging magnification of the converter lens RCL is 1.60.

A first lens unit is configured of a cemented lens of a negative lens G1 and a positive lens G2.

A second lens unit consists of a cemented lens consisting of a negative lens and a positive lens, a negative lens, a positive lens, a negative lens, and a positive lens arranged from the object side toward the image side in this order. That is, the converter lens RCL includes four negative lenses.

Third Embodiment

Figure 7A:
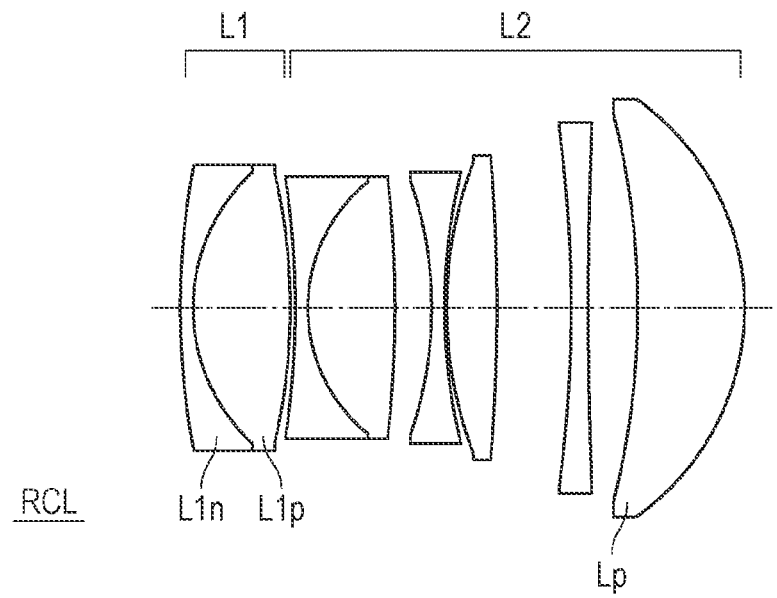
FIG. 7A is a cross-section view of a converter lens according to a third embodiment.
Figure 7B:
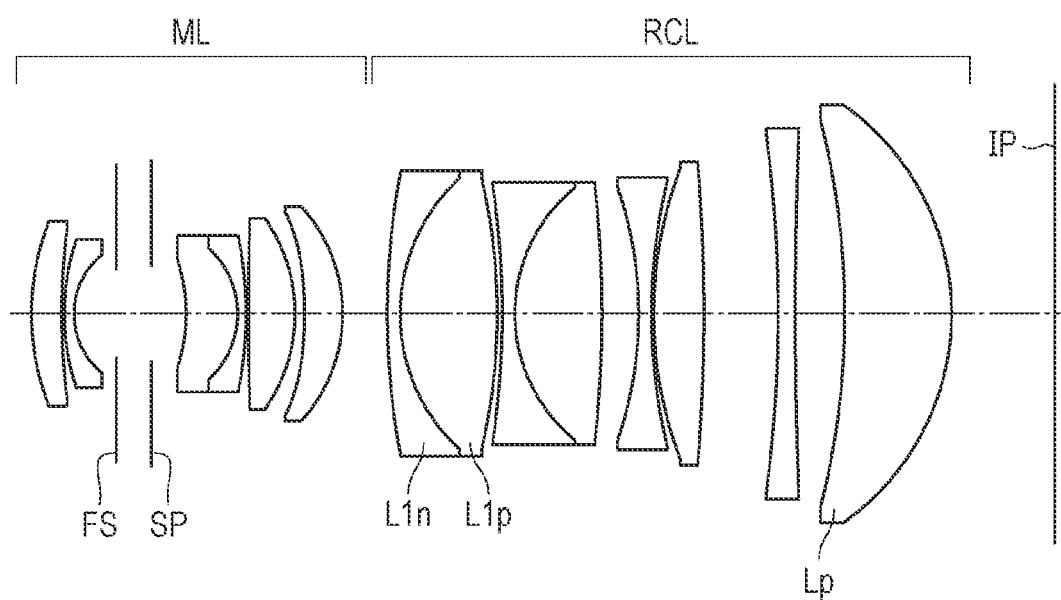
FIG. 7B is a cross-section view of the converter lens according to the third embodiment arranged on the image side of the master lens.

FIG. 7A is a cross-section view of a converter lens RCL according to the third embodiment. FIG. 7B is a cross-section view of the master lens ML and the converter lens RCL according to the third embodiment arranged on the image side of the master lens ML. FIG. 8 and FIG. 9 are a longitudinal aberration diagram and a lateral aberration diagram, respectively, at the time of in-focus on an infinite object when the converter lens RCL according to the third embodiment is arranged on the image side of the master lens ML. The enlarging magnification of the converter lens RCL is 2.01.

The first lens unit is configured of a cemented lens of a negative lens G1 and a positive lens G2.

The second lens unit consists of a cemented lens consisting of a negative lens and a positive lens, a negative lens, a positive lens, a negative lens, and a positive lens arranged from the object side toward the image side in this order. That is, the converter lens RCL includes four negative lenses.

Fourth Embodiment

Figure 10A:
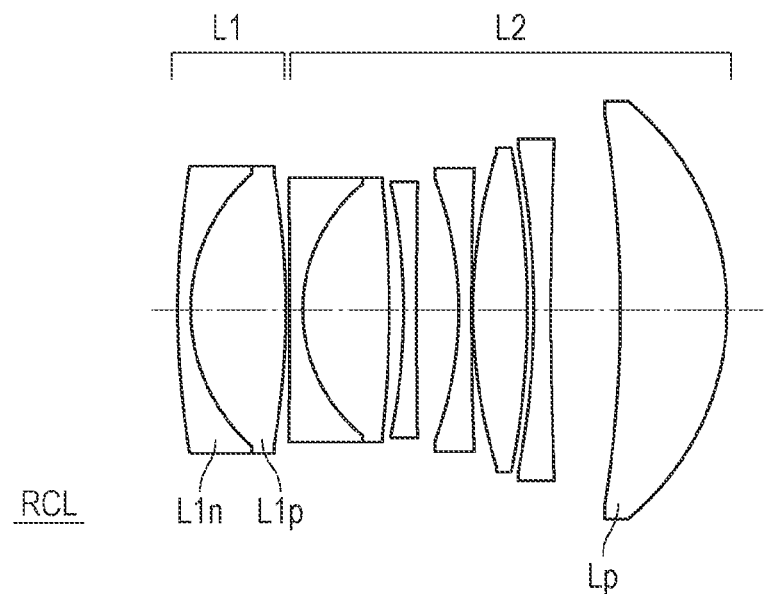
FIG. 10A is a cross-section view of a converter lens according to a fourth embodiment.
Figure 10B:
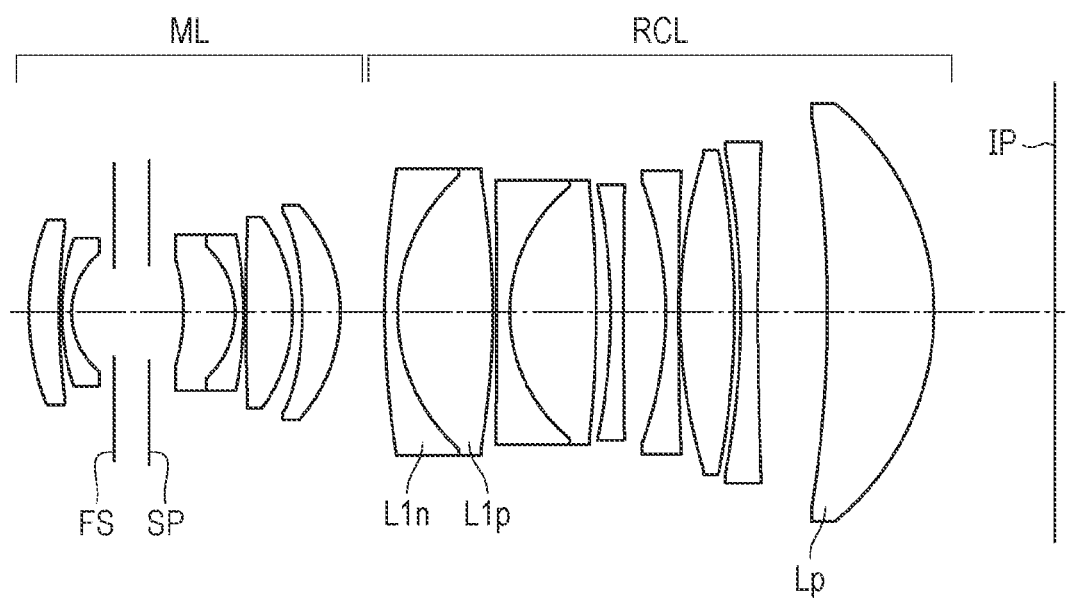
FIG. 10B is a cross-section view of the converter lens according to the fourth embodiment arranged on the image side of the master lens.

FIG. 10A is a cross-section view of a converter lens RCL according to the fourth embodiment. FIG. 10B is a cross-section view of the master lens ML and the converter lens RCL according to the fourth embodiment arranged on the image side of the master lens ML. FIG. 11 and FIG. 12 are a longitudinal aberration diagram and a lateral aberration diagram, respectively, at the time of in-focus on an infinite object when the converter lens RCL according to the fourth embodiment is arranged on the image side of the master lens ML. The enlarging magnification of the converter lens RCL is 2.02.

The first lens unit is configured of a cemented lens of a negative lens G1 and a positive lens G2.

The second lens unit consists of a cemented lens consisting of a negative lens and a positive lens, a negative lens, a negative lens, a positive lens, a negative lens, and a positive lens arranged from the object side toward the image side in this order. That is, the converter lens RCL includes five negative lenses.

Fifth Embodiment

Figure 13A:
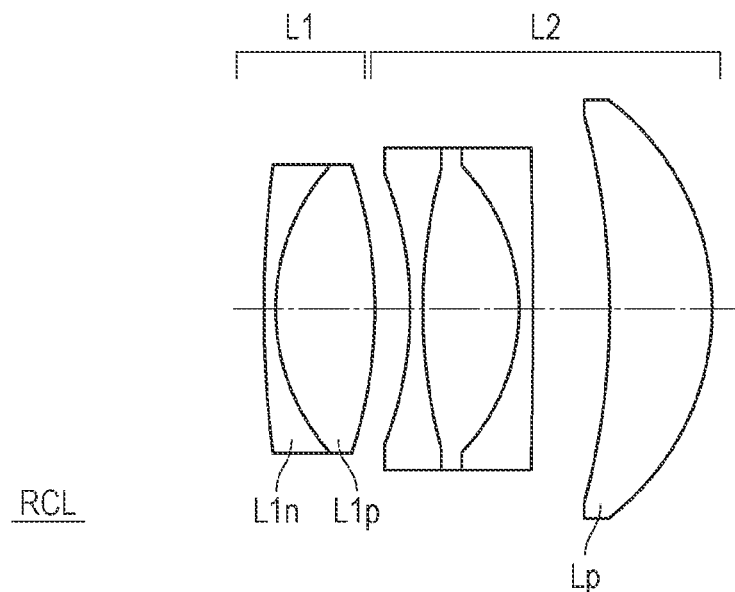
FIG. 13A is a cross-section view of a converter lens according to a fifth embodiment.
Figure 13B:
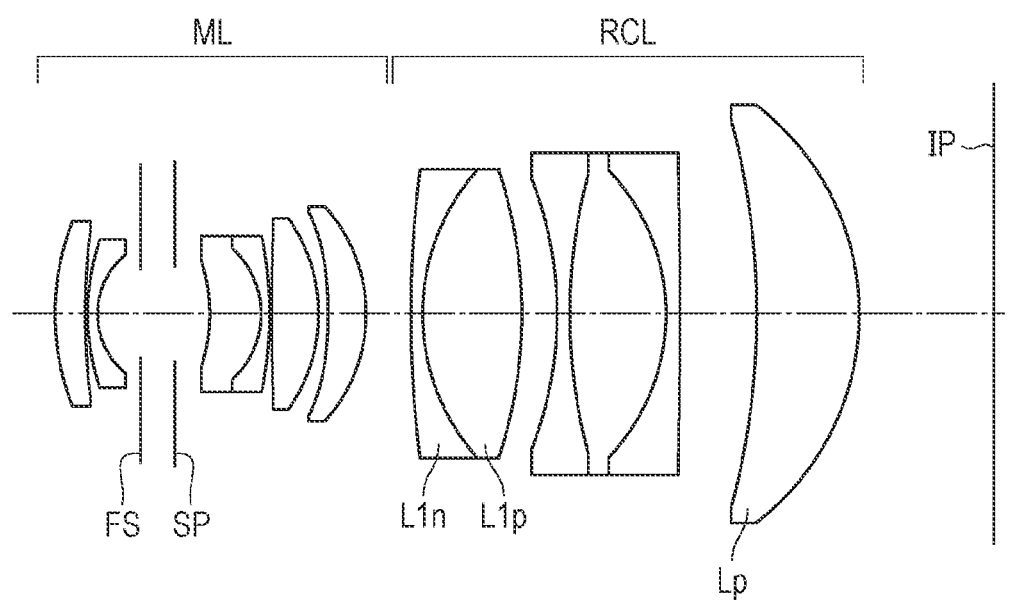
FIG. 13B is a cross-section view of the converter lens according to the fifth embodiment arranged on the image side of the master lens.

FIG. 13A is a cross-section view of a converter lens RCL according to the fifth embodiment. FIG. 13B is a cross-section view of the master lens ML and the converter lens RCL according to the fifth embodiment arranged on the image side of the master lens ML. FIG. 14 and FIG. 15 are a longitudinal aberration diagram and a lateral aberration diagram, respectively, at the time of in-focus on an infinite object when the converter lens according to the fifth embodiment is arranged on the image side of the master lens ML. The enlarging magnification of the converter lens RCL is 1.61.

The first lens unit is configured of a cemented lens of a negative lens G1 and a positive lens G2.

The second lens unit consists of a cemented lens consisting of a negative lens, a positive lens, and a negative lens, and a positive lens arranged on the image side of the cemented lens. That is, the converter lens RCL includes three negative lenses.

Sixth Embodiment

Figure 16A:
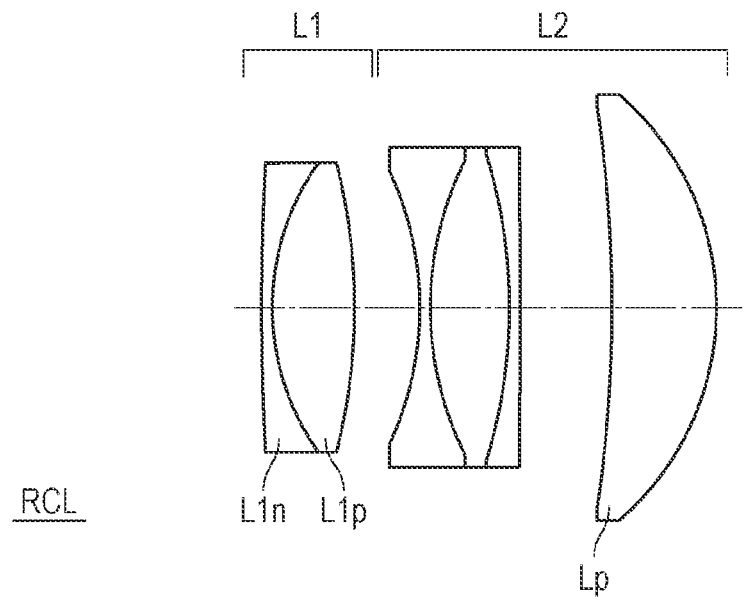
FIG. 16A is a cross-section view of a converter lens according to a sixth embodiment.
Figure 16B:
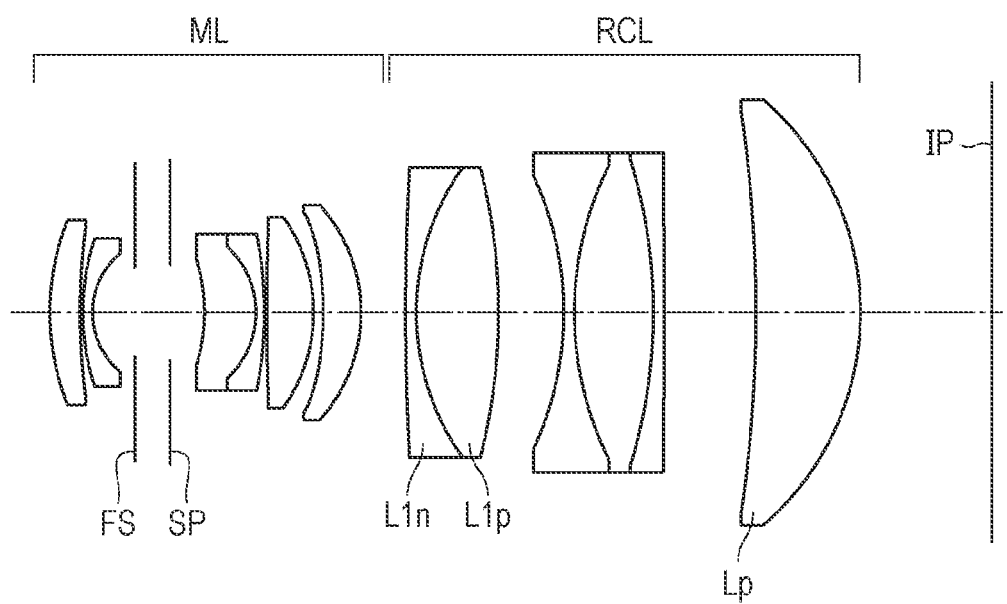
FIG. 16B is a cross-section view of the converter lens according to the sixth embodiment arranged on the image side of the master lens.
Figure 17:
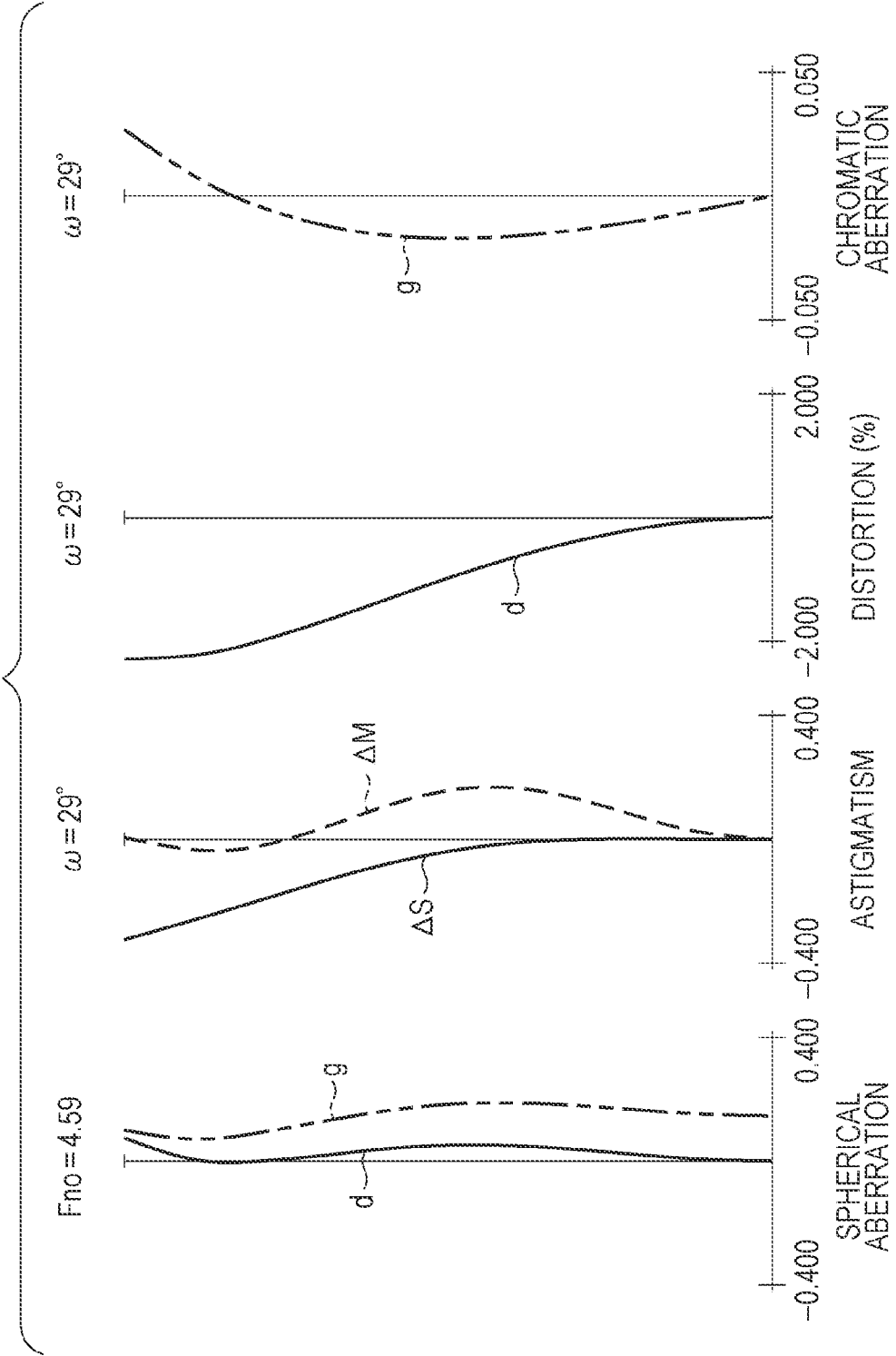
FIG. 17 is a longitudinal aberration diagram at the time of in-focus on an infinite object when the converter lens according to the sixth embodiment is arranged on the image side of the master lens.
Figure 18:
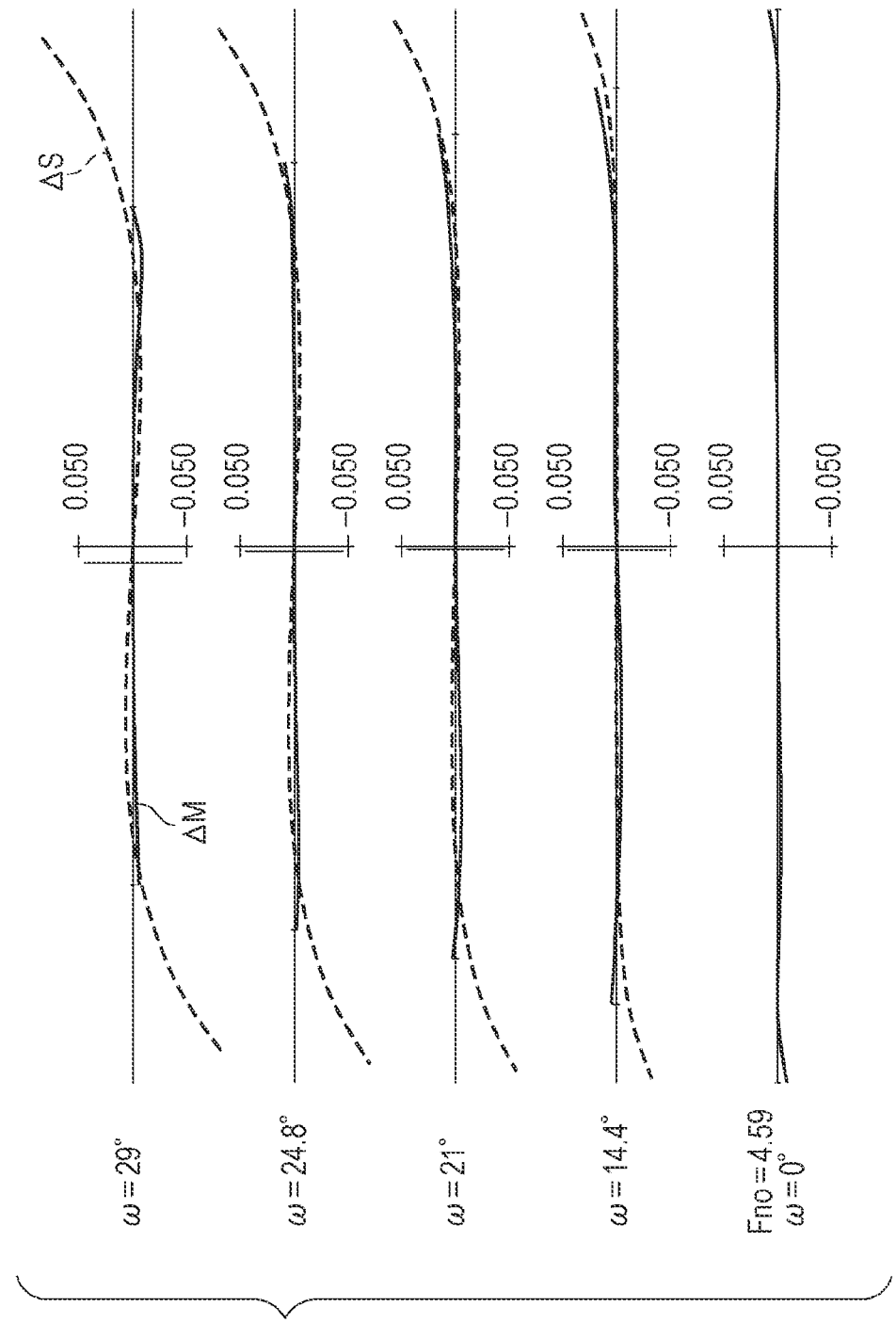
FIG. 18 is a lateral aberration diagram at the time of in-focus on an infinite object when the converter lens according to the sixth embodiment is arranged on the image side of the master lens.

FIG. 16A is a cross-section view of a converter lens RCL according to the sixth embodiment. FIG. 16B is a cross-section view of the master lens ML and the converter lens RCL according to the sixth embodiment arranged on the image side of the master lens ML. FIG. 17 and FIG. 18 are a longitudinal aberration diagram and a lateral aberration diagram, respectively, at the time of in-focus on an infinite object when the converter lens RCL according to the sixth embodiment is arranged on the image side of the master lens ML. The enlarging magnification of the converter lens RCL is 1.59.

The first lens unit is configured of a cemented lens of a negative lens G1 and a positive lens G2.

The second lens unit consists of a cemented lens consisting of a negative lens, a positive lens, and a negative lens, and a positive lens arranged on the image side of the cemented lens. That is, the converter lens RCL includes three negative lenses.

[Master Lens]

FIG. 19 is a cross-section view of the master lens ML at the time of in-focus on an infinite object. FIG. 20 is a longitudinal aberration diagram of the master lens ML at the time of in-focus on an infinite object. FIG. 21 is a lateral aberration diagram of the master lens ML at the time of in-focus on an infinite object.

The master lens ML is a fixed focal length lens consisting of an aperture stop SP, a front lens group Lf arranged on the object side of the aperture stop SP, and a rear lens group Lr arranged on the image side of the aperture stop SP. The F-number of the master lens ML is 2.88, and the half angle of view thereof is 29 degrees. The above-described master lens ML is exemplary, and any other optical system capable of forming an image on the image plane may be employed.

Numerical Embodiments

A numerical embodiment of the master lens ML, and first to sixth numerical embodiments corresponding to the converter lenses RCL according to the first to sixth embodiments, respectively, will be described.

In each numerical embodiment, a surface number indicates an order of an optical surface from the object side. The definition of reference symbols are as described above, where r indicates a curvature radius (mm) of an optical surface, d at a surface number i indicates an interval (mm) between an i-th optical surface and an i+1-th optical surface, nd indicates a refractive index of a material of an optical member at the d-line, and vd indicates an Abbe number of a material of an optical member with respect to the d-line.

BF indicates backfocus. Backfocus denotes a length on an optical axis from the surface closest to the image side to a paraxial image plane in air-converted length.

A lens full length of the master lens ML is a length in which a length on an optical axis from a surface (first lens surface) of the master lens ML closest to the object side to a surface (final lens surface) of the master lens ML closest to the image side is added with backfocus. A lens full length when a converter lens RCL is arranged on the image side of the master lens ML is a length in which a length on an optical axis from the surface of the master lens ML closest to the object side to the surface of the converter lens RCL closest to the image side is added with backfocus of the converter lens RCL.

A lens interval between the master lens and the converter lens is a length on an optical axis from the surface of the master lens closest to the image side to the surface of the converter lens closest to the object side. The interval between the master lens and the converter lens is denoted in air-converted length. An enlarging magnification is a ratio of the focal length of the entire system when the master lens and the converter lens are employed relative to the focal length of the master lens.

A lens structure length of the converter lens is a length on an optical axis from the surface of the converter lens closest to the object side to the surface of the converter lens closest to the image side.

An effective aperture is an aperture in a range in which an on-axis light and an off-axis light pass. An incident pupil position is a length from the surface closest to the object side to the incident pupil, and an exit pupil position is a length from the surface closest to the image side to the exit pupil. A front principal point position is a length from the surface closest to the object side to the front principal point, and a rear principal point position is a length from the surface closest to the image side to the rear principal point. Each numerical value of the front principal point position and the rear principal point position is the paraxial amount, and its symbol assumes a direction from the object side toward the image side as positive.

When the optical surface is aspherical, a symbol * is denoted on the right of a surface number. Assuming x for the displacement amount from a surface vertex in an optical axis direction, h for the height from an optical axis in a direction vertical to the optical axis, R for a paraxial curvature radius, k for a conic constant, and A4, A6, A8, A10, and A12 for an aspherical coefficient of each order, an aspherical shape is expressed as follows:

$$x=(h^2/R)/[1+\{1-(1+k)(h/R)^2\}^{1/2}+A4 \times h^4+A6 \times h^6+A8 \times h^8+A10 \times h^{10}+A12 \times h^{12}.$$

"e±XX" at each aspherical coefficient indicates "×10±$^{XX}$." The physical amounts used in the abovementioned conditional equations according to the first to sixth numerical embodiments are indicated in [Table 1], and the values corresponding to the respective conditional equations are indicated in [Table 2].

The lengths in the following numerical embodiments are expressed in mm and the angles are expressed in degrees, but the lengths may be expressed in other unit since the optical system can be used to be proportionally increased or proportionally decreased.

[Master Lens]— for all of First to Sixth Numerical Embodiments of Converter Lenses In mm

| | | Surface data | | | |
|---|---|---|---|---|---|
| Surface number | r | d | nd | vd | Effective aperture |
| 1 | 23.706 | 2.83 | 1.91082 | 35.3 | 16.13 |
| 2 | 63.184 | 0.25 | | | 14.42 |
| 3 | 22.266 | 0.90 | 1.48749 | 70.2 | 12.89 |
| 4 | 7.213 | 4.00 | | | 10.11 |
| 5 | ∞ | 3.26 | | | 8.13(Flare-cut stop) |
| 6(Stop) | ∞ | 3.24 | | | 8.78 |
| 7 | −16.321 | 4.82 | 1.69680 | 55.5 | 9.30 |
| 8 | −8.400 | 0.80 | 1.80610 | 33.3 | 11.37 |
| 9 | −36.438 | 0.20 | | | 13.67 |
| 10 | 227.537 | 4.39 | 1.59522 | 67.7 | 15.23 |
| 11 | −15.547 | 0.90 | | | 16.72 |
| 12* | −34.842 | 3.55 | 1.58313 | 59.4 | 17.76 |
| 13 | −15.035 | 35.68 | | | 18.94 |
| Image plane | ∞ | | | | |

Aspherical data
12-th surface

K = 0.00000e+000 A 4 = −5.24174e−005 A 6 = 5.25723e−008 A 8 = −3.53661e−009
A10 = 3.36031e−011 A12 = −1.48386e−013

| Various items of data of master lens | |
|---|---|
| Focal length | 24.50 |
| F-number | 2.88 |
| Half angle of view (degrees) | 29.14 |
| Image height | 13.66 |
| Lens full length | 64.83 |
| BF | 35.68 |
| Incident pupil position | 10.34 |
| Exit pupil position | −35.77 |
| Front principal point position | 26.44 |
| Rear principal point position | 11.18 |

-continued

Single lens data of master lens

| Lens | Start surface | Focal length |
|---|---|---|
| 1 | 1 | 40.28 |
| 2 | 3 | −22.32 |
| 3 | 7 | 19.87 |
| 4 | 8 | −13.72 |
| 5 | 10 | 24.62 |
| 6 | 12 | 42.54 |

[Converter Lens]

First Numerical Embodiment

In mm

Surface data

| Surface number | r | d | nd | vd | Effective aperture |
|---|---|---|---|---|---|
| 1 | 141.314 | 1.20 | 1.95375 | 32.3 | 25.80 |
| 2 | 20.811 | 8.90 | 1.80518 | 25.4 | 25.40 |
| 3 | −50.545 | 4.45 | | | 25.60 |
| 4 | −36.637 | 1.20 | 2.00100 | 29.1 | 24.10 |
| 5 | 62.836 | 8.70 | 1.62588 | 35.7 | 25.00 |
| 6 | −19.857 | 1.30 | 2.00100 | 29.1 | 25.80 |
| 7 | −424.225 | 7.20 | | | 29.00 |
| 8 | −74.271 | 9.35 | 1.59551 | 39.2 | 35.20 |
| 9 | −25.409 | 13.96 | | | 37.90 |
| Image plane | ∞ | | | | |

| Interval between master lens and converter lens | 4.19 |
|---|---|

Various items of data when converter lens is arranged on image side of master lens

| Focal length | 39.54 |
|---|---|
| F-number | 4.65 |
| Half angle of view (degrees) | 28.68 |
| Image height | 21.64 |
| Lens full length | 89.59 |
| BF | 13.96 |

Various items of data of converter lens

| Focal length | −148.00 |
|---|---|
| Lens structure length | 42.30 |
| Front principal point position | −24.78 |
| Rear principal point position | −76.86 |
| Enlarging magnification | 1.61 |

Single lens data of converter lens

| Lens | Start surface | Focal length |
|---|---|---|
| 1 | 1 | −25.71 |
| 2 | 2 | 19.39 |
| 3 | 4 | −22.98 |
| 4 | 5 | 25.13 |
| 5 | 6 | −20.84 |
| 6 | 8 | 60.53 |

Second Numerical Embodiment

In mm

Surface data

| Surface number | r | d | nd | vd | Effective aperture |
|---|---|---|---|---|---|
| 1 | 108.446 | 1.20 | 2.00100 | 29.1 | 25.90 |
| 2 | 18.934 | 8.60 | 1.85478 | 24.8 | 25.40 |
| 3 | −62.820 | 4.00 | | | 25.40 |
| 4 | −49.683 | 1.20 | 2.05090 | 26.9 | 24.30 |
| 5 | 27.755 | 6.00 | 1.80810 | 22.8 | 24.90 |
| 6 | −109.942 | 1.30 | | | 25.50 |
| 7 | −45.352 | 1.20 | 2.05090 | 26.9 | 25.60 |
| 8 | 144.322 | 0.10 | | | 27.30 |
| 9 | 49.805 | 5.00 | 1.53172 | 48.8 | 29.50 |
| 10 | −100.714 | 1.30 | | | 30.30 |
| 11 | −52.534 | 1.60 | 2.00100 | 29.1 | 30.40 |
| 12 | −149.361 | 2.90 | | | 32.10 |
| 13 | −86.192 | 8.00 | 1.54072 | 47.2 | 34.30 |
| 14 | −27.523 | 13.08 | | | 36.50 |
| Image plane | ∞ | | | | |

| Interval between master lens and converter lens | 4.19 |
|---|---|

Various items of data when converter lens is arranged on image side of master lens

| Focal length | 39.21 |
|---|---|
| F-number | 4.61 |
| Half angle of view (degrees) | 28.89 |
| Image height | 21.64 |
| Lens full length | 88.80 |
| BF | 13.08 |

Various items of data of converter lens

| Focal length | −83.09 |
|---|---|
| Lens structure length | 42.40 |
| Front principal point position | 0.34 |
| Rear principal point position | −36.78 |
| Enlarging magnification | 1.60 |

Single lens data of converter lens

| Lens | Start surface | Focal length |
|---|---|---|
| 1 | 1 | −23.07 |
| 2 | 2 | 17.89 |
| 3 | 4 | −16.81 |
| 4 | 5 | 27.97 |
| 5 | 7 | −32.73 |
| 6 | 9 | 63.41 |
| 7 | 11 | −81.63 |
| 8 | 13 | 71.36 |

Third Numerical Embodiment

In mm

Surface data

| Surface number | r | d | nd | vd | Effective aperture |
|---|---|---|---|---|---|
| 1 | 71.603 | 1.20 | 2.05090 | 26.9 | 25.50 |
| 2 | 17.334 | 9.10 | 1.85478 | 24.8 | 24.20 |
| 3 | −55.856 | 0.45 | | | 24.00 |
| 4 | −83.837 | 1.20 | 2.00100 | 29.1 | 23.40 |
| 5 | 15.257 | 8.15 | 1.80810 | 22.8 | 22.50 |
| 6 | −109.942 | 3.45 | | | 22.80 |
| 7 | −36.477 | 1.20 | 2.05090 | 26.9 | 22.80 |
| 8 | 53.517 | 0.20 | | | 24.30 |
| 9 | 38.586 | 4.70 | 1.53172 | 48.8 | 26.20 |
| 10 | −174.517 | 6.95 | | | 27.20 |
| 11 | −127.684 | 1.60 | 2.00100 | 29.1 | 32.50 |
| 12 | 424.763 | 4.65 | | | 33.50 |
| 13 | −73.668 | 10.00 | 1.51742 | 52.4 | 35.20 |
| 14 | −24.017 | 11.00 | | | 37.90 |
| Image plane | ∞ | | | | |

| Interval between master lens and converter lens | 4.19 |
|---|---|

Various items of data when converter lens is arranged on image side of master lens

| Focal length | 49.27 |
|---|---|
| F-number | 5.79 |
| Half angle of view (degrees) | 23.71 |
| Image height | 21.64 |
| Lens full length | 97.18 |
| BF | 11.00 |

Various items of data of converter lens

| Focal length | −81.18 |
|---|---|
| Lens structure length | 52.85 |
| Front principal point position | −9.30 |
| Rear principal point position | −71.02 |
| Enlarging magnification | 2.01 |

Single lens data of converter lens

| Lens | Start surface | Focal length |
|---|---|---|
| 1 | 1 | −22.01 |
| 2 | 2 | 16.42 |
| 3 | 4 | −12.82 |
| 4 | 5 | 17.08 |
| 5 | 7 | −20.50 |
| 6 | 9 | 59.89 |
| 7 | 11 | −97.93 |
| 8 | 13 | 64.44 |

Fourth Numerical Embodiment

In mm

Surface data

| Surface number | r | d | nd | vd | Effective aperture |
|---|---|---|---|---|---|
| 1 | 81.547 | 1.20 | 2.05090 | 26.9 | 25.60 |
| 2 | 17.175 | 8.90 | 1.85478 | 24.8 | 24.40 |
| 3 | −74.877 | 0.40 | | | 24.10 |
| 4 | −800.041 | 1.20 | 2.00100 | 29.1 | 23.60 |
| 5 | 15.215 | 8.10 | 1.80810 | 22.8 | 22.40 |
| 6 | −109.942 | 1.35 | | | 22.50 |
| 7 | −59.136 | 1.20 | 2.00100 | 29.1 | 22.40 |
| 8 | 800.004 | 3.95 | | | 22.80 |
| 9 | −35.142 | 1.20 | 2.05090 | 26.9 | 23.40 |
| 10 | 309.433 | 0.15 | | | 25.30 |
| 11 | 50.320 | 5.10 | 1.53172 | 48.8 | 28.20 |
| 12 | −77.229 | 0.60 | | | 29.10 |
| 13 | −79.630 | 1.60 | 2.00100 | 29.1 | 29.20 |
| 14 | 387.478 | 6.50 | | | 30.70 |
| 15 | −116.685 | 10.00 | 1.51742 | 52.4 | 35.50 |
| 16 | −25.328 | 13.96 | | | 37.90 |
| Image plane | ∞ | | | | |

| Interval between master lens and converter lens | 4.19 |
|---|---|

Various items of data when converter lens is arranged on image side of master lens

| Focal length | 49.40 |
|---|---|
| F-number | 5.81 |
| Half angle of view (degrees) | 23.65 |
| Image height | 21.64 |
| Lens full length | 98.73 |
| BF | 13.96 |

Various items of data of converter lens

| Focal length | −75.46 |
|---|---|
| Lens structure length | 51.45 |
| Front principal point position | −6.52 |
| Rear principal point position | −62.68 |
| Enlarging magnification | 2.02 |

Single lens data of converter lens

| Lens | Start surface | Focal length |
|---|---|---|
| 1 | 1 | −20.90 |
| 2 | 2 | 17.11 |
| 3 | 4 | −14.91 |
| 4 | 5 | 17.03 |
| 5 | 7 | −54.97 |
| 6 | 9 | −29.98 |
| 7 | 11 | 58.11 |
| 8 | 13 | −65.88 |
| 9 | 15 | 60.27 |

Fifth Numerical Embodiment

In mm

Surface data

| Surface number | r | d | nd | vd | Effective aperture |
|---|---|---|---|---|---|
| 1 | 105.372 | 1.10 | 1.90525 | 35.0 | 25.80 |
| 2 | 20.274 | 9.30 | 1.74077 | 27.8 | 25.40 |
| 3 | −43.036 | 3.30 | | | 25.50 |
| 4 | −34.856 | 1.20 | 1.85150 | 40.8 | 24.20 |
| 5 | 50.808 | 9.00 | 1.54072 | 47.2 | 24.90 |
| 6 | −19.532 | 1.30 | 2.00330 | 28.3 | 25.60 |
| 7 | −612.486 | 7.20 | | | 28.90 |
| 8 | −70.239 | 9.60 | 1.61293 | 37.0 | 35.20 |
| 9 | −24.676 | 13.95 | | | 37.90 |
| Image plane | ∞ | | | | |

| Interval between master lens and converter lens | 4.19 |
|---|---|

Various items of data when converter lens is arranged on image side of master lens

| Focal length | 39.45 |
|---|---|
| F-number | 4.64 |
| Half angle of view (degrees) | 28.74 |
| Image height | 21.64 |
| Lens full length | 89.28 |
| BF | 13.95 |

-continued

Various items of data of converter lens

| | |
|---|---|
| Focal length | −162.19 |
| Lens structure length | 42.00 |
| Front principal point position | −29.93 |
| Rear principal point position | −84.93 |
| Enlarging magnification | 1.61 |

Single lens data of converter lens

| Lens | Start surface | Focal length |
|---|---|---|
| 1 | 1 | −27.90 |
| 2 | 2 | 19.84 |
| 3 | 4 | −24.12 |
| 4 | 5 | 27.32 |
| 5 | 6 | −20.13 |
| 6 | 8 | 57.46 |

Sixth Numerical Embodiment

In mm

Surface data

| Surface number | r | d | nd | vd | Effective aperture |
|---|---|---|---|---|---|
| 1 | 258.268 | 1.00 | 2.00100 | 29.1 | 25.80 |
| 2 | 23.518 | 7.70 | 1.85478 | 24.8 | 25.70 |
| 3 | −54.781 | 6.10 | | | 25.90 |
| 4 | −30.390 | 1.00 | 2.05090 | 26.9 | 24.40 |
| 5 | 31.048 | 7.40 | 1.89286 | 20.4 | 26.30 |
| 6 | −48.829 | 1.00 | 2.24163 | 16.9 | 27.30 |
| 7 | −1396.349 | 8.60 | | | 28.70 |
| 8 | −130.600 | 9.80 | 1.51742 | 52.4 | 36.30 |
| 9 | −26.447 | 13.65 | | | 38.60 |
| Image height | ∞ | | | | |

| | |
|---|---|
| Interval between master lens and converter lens | 4.19 |

Various items of data when converter lens is arranged on image side of master lens

| | |
|---|---|
| Focal length | 39.02 |
| F-number | 4.59 |
| Half angle of view (degrees) | 29.00 |
| Image height | 21.64 |
| Lens full length | 89.58 |
| BF | 13.65 |

Various items of data of converter lens

| | |
|---|---|
| Focal length | −194.07 |
| Lens structure length | 42.60 |
| Front principal point position | −40.70 |
| Rear principal point position | −101.32 |
| Enlarging magnification | 1.59 |

Single lens data of converter lens

| Lens | Start surface | Focal length |
|---|---|---|
| 1 | 1 | −25.90 |
| 2 | 2 | 20.16 |
| 3 | 4 | −14.49 |
| 4 | 5 | 22.23 |
| 5 | 6 | −40.77 |
| 6 | 8 | 62.10 |

TABLE 1

| Numerical value | First numerical embodiment | Second numerical embodiment | Third numerical embodiment | Fourth numerical embodiment | Fifth numerical embodiment | Sixth numerical embodiment |
|---|---|---|---|---|---|---|
| Ndave | 1.98525 | 2.02595 | 2.02595 | 2.02090 | 1.92002 | 2.09784 |
| R1 | −74.271 | −86.192 | −73.668 | −116.685 | −70.239 | −130.600 |
| R2 | −25.409 | −27.523 | −24.017 | −25.328 | −24.676 | −26.447 |
| sk | 13.961 | 13.078 | 11.000 | 13.958 | 13.949 | 13.651 |
| TD | 42.300 | 42.400 | 52.850 | 51.450 | 42.000 | 42.600 |
| f1 | 64.383 | 66.738 | 54.431 | 78.133 | 56.824 | 74.656 |
| f2 | −52.306 | −38.060 | −36.198 | −41.299 | −50.216 | −65.021 |
| f | −148.003 | −83.095 | −81.181 | −75.460 | −162.193 | −194.067 |

TABLE 2

| Conditional equation | First numerical embodiment | Second numerical embodiment | Third numerical embodiment | Fourth numerical embodiment | Fifth numerical embodiment | Sixth numerical embodiment |
|---|---|---|---|---|---|---|
| (1) Ndave | 1.98525 | 2.02595 | 2.02595 | 2.02090 | 1.92002 | 2.09784 |
| (2) (R1 + R2)/(R1 − R2) | 2.040 | 1.938 | 1.967 | 1.554 | 2.083 | 1.508 |
| (3) sk/TD | 0.330 | 0.308 | 0.208 | 0.271 | 0.332 | 0.320 |
| (4) f1/f2 | −1.231 | −1.754 | −1.504 | −1.892 | −1.132 | −1.148 |
| (5) f1/f | −0.435 | −0.803 | −0.670 | −1.035 | −0.350 | −0.385 |

Embodiment of Image Pickup Apparatus

Figure 22A:
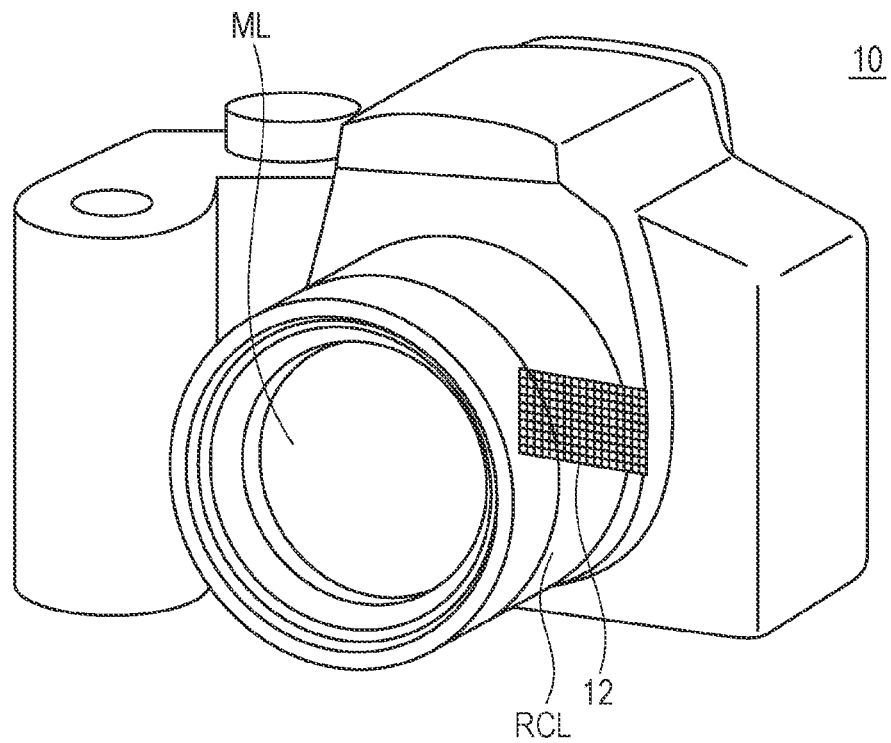
FIG. 22A is a perspective view illustrating a configuration of an image pickup apparatus.
Figure 22B:
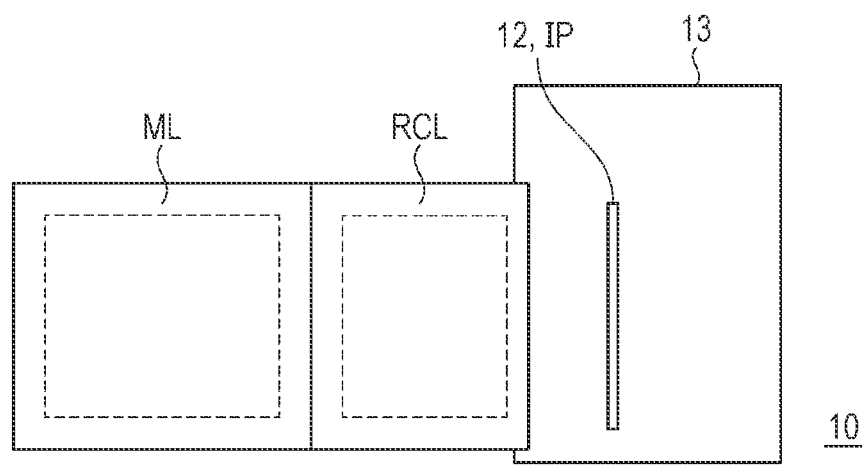
FIG. 22B is a side view illustrating the configuration of the image pickup apparatus.

FIG. 22 is diagrams illustrating a configuration of an image pickup apparatus (digital camera) 10. FIG. 22A is a perspective view and FIG. 22B is a side view. The image pickup apparatus 10 includes a camera main body 13, the master lens ML, a converter lens RCL similar to that according to any one of the above first to sixth embodiments, and a light receiving device (imaging device) 12 for photoelectrically converting an image formed by the master lens ML and the converter lens RCL. The light receiving device 12 can employ an imaging device such as CCD sensor or CMOS sensor. The master lens ML and the converter lens RCL may be integrally configured with the camera main body 13, or may be configured to be detachable from the camera main body 13, respectively.

When the master lens ML and the converter lens RCL are integrally configured with the camera main body 13, the converter lens RCL is configured to be able to be inserted on an optical axis.

Embodiment of Interchangeable Lens

The aspect of the embodiments is applicable to an interchangeable lens in which the master lens ML and the converter lens RCL are configured in the same barrel and which is detachable from the image pickup apparatus. The interchangeable lens may be a fixed focal length lens with fixed focal length, or may be a zoom lens with variable focal length. In this case, the converter lens RCL is configured to be able to be inserted on an optical axis. The converter lens RCL is arranged on an optical axis or off an optical axis in response to a user instruction via an operation member or user interface.

Exemplary embodiments of the disclosure have been described above, but the disclosure is not limited to the embodiments and examples, and can be variously combined, modified, and change within the scope of the spirit.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A converter lens which has a negative refractive power and increases a focal length of an entire system when arranged on an image side of a master lens, the converter lens consisting of:
   a first lens unit having positive refractive power; and
   a second lens unit having negative refractive power and arranged on an image side of the first lens unit,
   wherein the first lens unit consists of a negative lens and a first positive lens,
   wherein three negative lenses are included in the converter lens, and
   wherein the following inequalities are satisfied:

$1.92 < Ndave < 2.10$, $-1.40 < f1/f \leq -0.670$, and $0.10 < sk/TD < 0.35$, where Ndave represents an average refractive index at a d-line of a material of the three negative lenses included in the converter lens, f1 represents a focal length of the first lens unit, f represents a focal length of the converter lens, sk represents an air-converted length from a surface of the converter lens closest to the image side to an image plane while the converter lens is arranged on the image side of the master lens, and TD represents a length on an optical axis from a surface of the converter lens closest to the object side to a surface closest to the image side.

2. The converter lens according to claim 1, wherein the second lens unit including a second positive lens arranged closest to an image side of the converter lens,
   wherein the following inequality is satisfied:

$1.30 < (R1+R2)/(R1-R2) < 2.50$, where R1 represents a curvature radius of a surface of the second positive lens on an object side and R2 represents a curvature radius of a surface of the second positive lens on the image side.

3. The converter lens according to claim 1,
   wherein the negative lens and the first positive lens are cemented to each other.

4. The converter lens according to claim 1,
   wherein the following inequality is satisfied:

$-2.30 < f1/f2 < -0.95$, where f1 represents a focal length of the first lens unit and f2 represents a focal length of the second lens unit.

5. The converter lens according to claim 1,
   wherein the second lens unit includes three or more negative lenses.

6. The converter lens according to claim 1,
   wherein the second lens unit comprises four or more negative lenses.

7. An interchangeable lens comprising:
   a master lens; and
   a converter lens which has a negative refractive power and increases a focal length of an entire system when arranged on an image side of the master lens,
   wherein the converter lens consists of
      a first lens unit having positive refractive power and
      second lens unit having negative refractive power and arranged on an image side of the first lens unit,
   wherein the first lens unit consists of a negative lens and a first positive lens,
   wherein three negative lenses are included in the converter lens, and
   wherein the following inequalities is satisfied:

$1.92 < Ndave < 2.10$, $-1.40 < f1/f \leq -0.670$, and $0.10 < sk/TD < 0.35$, where Ndave represents an average refractive index at the d-line of a material of the three negative lenses included in the converter lens, f1 represents a focal length of the first lens unit, f represents a focal length of the converter lens, sk represents an air-converted length from a surface of the converter lens closest to the image side to an image plane while the converter lens is arranged on the image side of the master lens, and TD represents a length on an optical axis from a surface of the converter lens closest to the object side to a surface closest to the image side.

8. The interchangeable lens according to claim 7, wherein the second lens unit including a second positive lens arranged closest to an image side of the converter lens, wherein the following inequality is satisfied:

$1.30 < (R1+R2)/(R1-R2) < 2.50$, where R1 represents a curvature radius of a surface of the second positive lens on an object side and R2 represents a curvature radius of a surface of the second positive lens on the image side.

9. The interchangeable lens according to claim 7, wherein the negative lens and the first positive lens are cemented to each other.

10. The interchangeable lens according to claim 7, wherein the following inequality is satisfied:

$-2.30 < f1/f2 < -0.95$, where f1 represents a focal length of the first lens unit and f2 represents a focal length of the second lens unit.

11. The interchangeable lens according to claim 7, wherein the following inequality is satisfied:

$-1.40 < f1/f < -0.30$, where f1 represents a focal length of the first lens unit and f represents a focal length of the converter lens.

12. An apparatus comprising:
a master lens;
a converter lens which has a negative refractive power and increases a focal length of an entire system when arranged on an image side of the master lens; and
an imaging device configured to receive an image formed by the master lens and the converter lens,
wherein the converter lens consists of
a first lens unit having positive refractive power and second lens unit having negative refractive power and arranged on an image side of the first lens unit,
wherein the first lens unit consists of a negative lens and a first positive lens,
wherein three negative lenses are included in the converter lens, and
wherein the following inequalities is satisfied:

$1.92 < Ndave < 2.10$, $-1.40 < f1/fs \leq -0.670$, and $0.10 < sk/TD < 0.35$, where Ndave represents an average refractive index at the d-line of a material of the three negative lenses included in the converter lens, f1 represents a focal length of the first lens unit, f represents a focal length of the converter lens, sk represents an air-converted length from a surface of the converter lens closest to the image side to an image plane while the converter lens is arranged on the image side of the master lens, and TD represents a length on an optical axis from a surface of the converter lens closest to the object side to a surface closest to the image side.

13. The apparatus according to claim 12, wherein the second lens unit including a second positive lens arranged closest to an image side of the converter lens, wherein the following inequality is satisfied:

$1.30 < (R1+R2)/(R1-R2) < 2.50$, where R1 represents a curvature radius of a surface of the second positive lens on an object side and R2 represents a curvature radius of a surface of the second positive lens on the image side.

14. The apparatus according to claim 12, wherein the negative lens and the first positive lens are cemented to each other.

15. The apparatus according to claim 12, wherein the following inequality is satisfied:

$-2.30 < f1/f2 < -0.95$, where f1 represents a focal length of the first lens unit and f2 represents a focal length of the second lens unit.

16. The apparatus according to claim 12, wherein the following inequality is satisfied:

$-1.40 < f1/f < -0.30$, where f1 represents a focal length of the first lens unit and f represents a focal length of the converter lens.

* * * * *